United States Patent
Ogata et al.

(10) Patent No.: US 10,818,099 B2
(45) Date of Patent: Oct. 27, 2020

(54) IMAGE PROCESSING METHOD, DISPLAY DEVICE, AND INSPECTION SYSTEM

(71) Applicant: Ricoh Company, Ltd., Tokyo (JP)

(72) Inventors: Koretaka Ogata, Kanagawa (JP); Takayuki Okatani, Miyagi (JP)

(73) Assignees: RICOH COMPANY, LTD., Tokyo (JP); TOHOKU UNIVERSITY, Miyagi (JP)

(*) Notice: Subject to any disclaimer, the term of this patent is extended or adjusted under 35 U.S.C. 154(b) by 20 days.

(21) Appl. No.: 16/082,799

(22) PCT Filed: Mar. 8, 2017

(86) PCT No.: PCT/JP2017/009342
§ 371 (c)(1),
(2) Date: Sep. 6, 2018

(87) PCT Pub. No.: WO2017/155005
PCT Pub. Date: Sep. 14, 2017

(65) Prior Publication Data
US 2019/0026955 A1 Jan. 24, 2019

(30) Foreign Application Priority Data
Mar. 9, 2016 (JP) .................. 2016-046322
Nov. 8, 2016 (JP) .................. 2016-217782

(51) Int. Cl.
*G06T 19/20* (2011.01)
*G06T 17/20* (2006.01)
(Continued)

(52) U.S. Cl.
CPC .............. *G06T 19/20* (2013.01); *G06T 7/579* (2017.01); *G06T 17/20* (2013.01); *G06T 19/00* (2013.01);
(Continued)

(58) Field of Classification Search
CPC ......... G06T 19/20; G06T 7/579; G06T 17/20; G06T 19/00; G06T 2207/10032; G06T 2207/20076; G06T 2219/004
See application file for complete search history.

(56) References Cited

U.S. PATENT DOCUMENTS 6,246,412 B1 * 6/2001 Shum .................. G06T 15/10
345/419
2003/0025032 A1 2/2003 Lepretre et al.
(Continued)

FOREIGN PATENT DOCUMENTS

JP 2011-046355 3/2011
JP 2011-510378 3/2011
(Continued)

OTHER PUBLICATIONS

Nomura, Multi-perspective Panoramas, Eurographics Symposium on Rendering, Jun. 2007, pp. 1-87 (Year: 2007).*
(Continued)

*Primary Examiner* — Phuc N Doan
(74) *Attorney, Agent, or Firm* — Xsensus LLP

(57) ABSTRACT

A coefficient to transform a three-dimensional mesh approximating at least a part of a three-dimensional model including at least a part of a target object and generated from a plurality of two-dimensional images, into two-dimensional panoramic coordinates is determined. A first position on a first image determined from a plurality of two-dimensional images corresponding to a portion of the two-dimensional panoramic coordinates, and an annotation to be projected onto the two-dimensional panoramic coordinates are specified according to the first image. A second position corresponding to projection of the annotation onto the two-dimensional panoramic coordinates is determined. The annotation is superimposed on a second image obtained by projecting the first image onto the two-dimensional pan-
(Continued)

oramic coordinates. A third position corresponding to projection of the first position onto a third image is determined, and the annotation is projected and superimposed at the third position on the third image.

20 Claims, 20 Drawing Sheets

(51) Int. Cl.
    *G06T 7/579*     (2017.01)
    *G06T 19/00*     (2011.01)

(52) U.S. Cl.
    CPC ............... *G06T 2207/10032* (2013.01); *G06T 2207/20076* (2013.01); *G06T 2219/004* (2013.01)

(56) References Cited

U.S. PATENT DOCUMENTS

| | | | |
|---|---|---|---|
| 2006/0238536 A1* | 10/2006 | Katayama | G06T 3/4038 345/427 |
| 2009/0179895 A1 | 7/2009 | Zhu et al. | |
| 2010/0046803 A1* | 2/2010 | Tomita | H04N 1/3876 382/106 |
| 2012/0038638 A1 | 2/2012 | Zhu et al. | |
| 2014/0210817 A1 | 7/2014 | Zhu et al. | |
| 2014/0267592 A1* | 9/2014 | Lee | H04N 5/23238 348/36 |
| 2015/0220809 A1* | 8/2015 | Kawabata | G06T 7/001 382/195 |
| 2015/0304576 A1* | 10/2015 | Horak | H04N 5/23238 348/37 |
| 2016/0044240 A1* | 2/2016 | Beers | G06T 7/344 348/36 |
| 2016/0148413 A1* | 5/2016 | Oh | G06T 15/205 345/634 |
| 2016/0148419 A1* | 5/2016 | Ahn | G06T 15/506 345/426 |
| 2017/0069121 A1 | 3/2017 | Zhu et al. | |
| 2017/0070674 A1* | 3/2017 | Thurow | H04N 13/243 |
| 2018/0075652 A1* | 3/2018 | Kim | G06T 3/0062 |

FOREIGN PATENT DOCUMENTS

| | | | |
|---|---|---|---|
| JP | 2014-011720 | | 1/2014 |
| JP | 2015219679 | * | 5/2014 |
| JP | 2015-001756 | | 1/2015 |
| JP | 2015-219679 | | 12/2015 |
| WO | WO 01/48700 A1 | | 7/2001 |

OTHER PUBLICATIONS

International Search Report and Written Opinion dated Apr. 4, 2017 in PCT/JP2017/009342 filed on Mar. 8, 2017.
Extended European Search Report dated Jan. 25, 2019 in European Patent Application No. 17763345.0 11 pages.

* cited by examiner

[Fig. 1A]
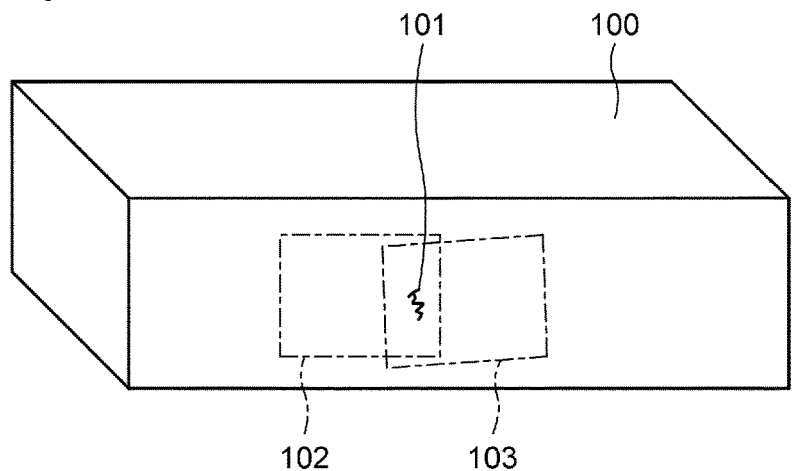
[Fig. 1B]
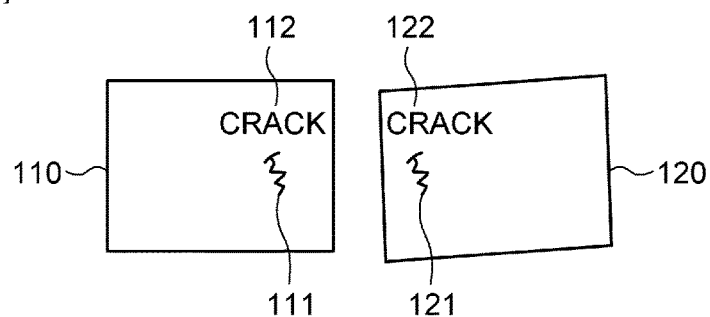
[Fig. 1C]
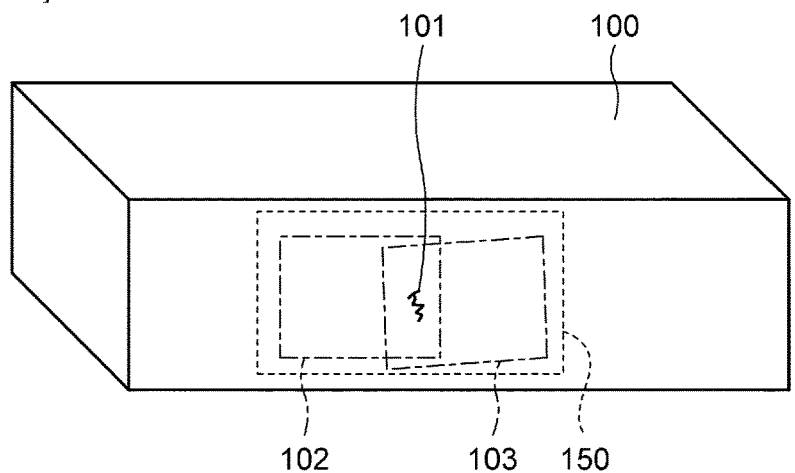
[Fig. 1D]
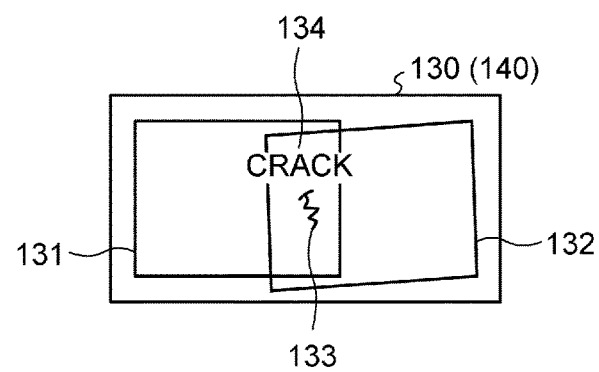

[Fig. 2]
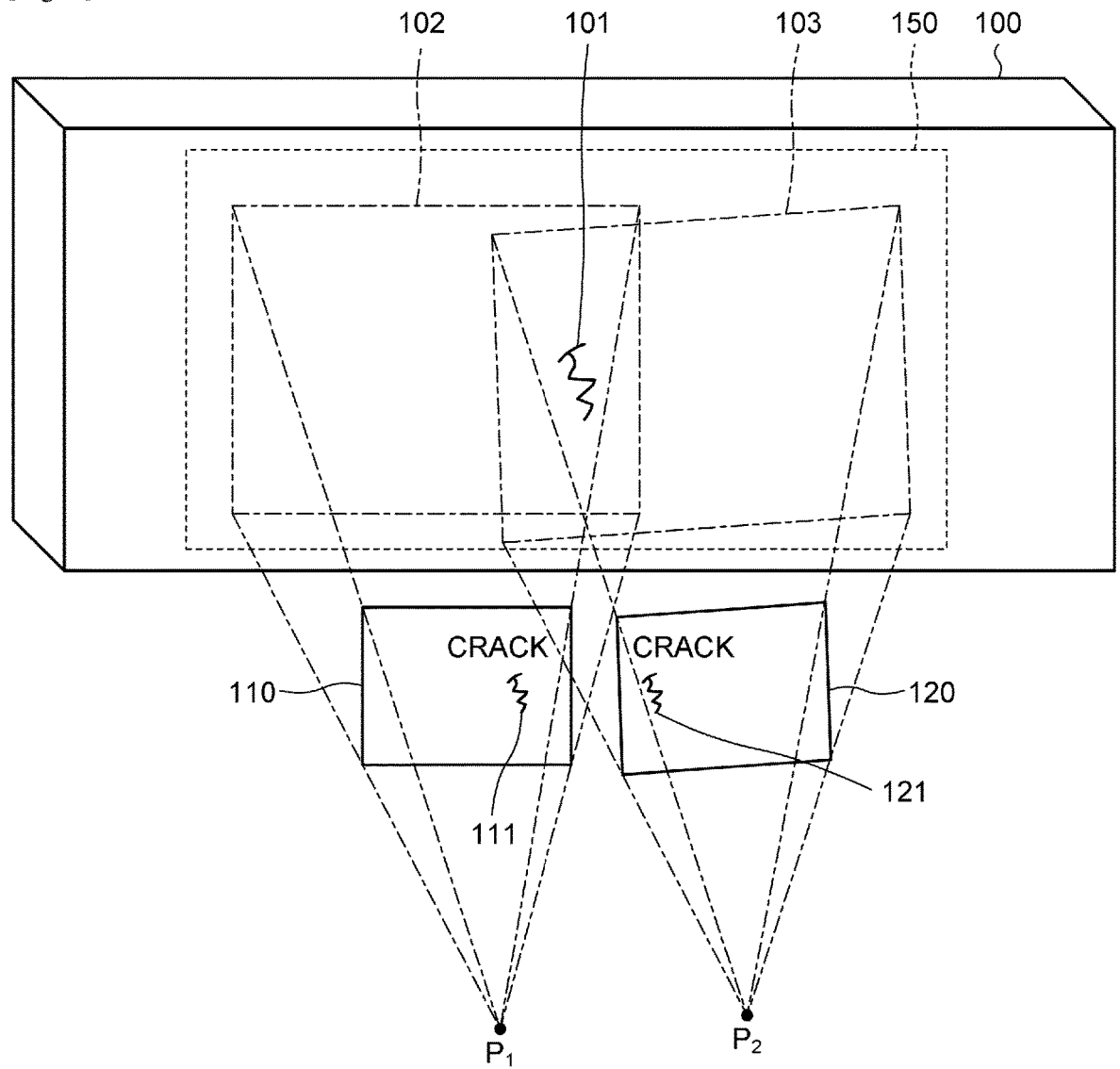

[Fig. 3]
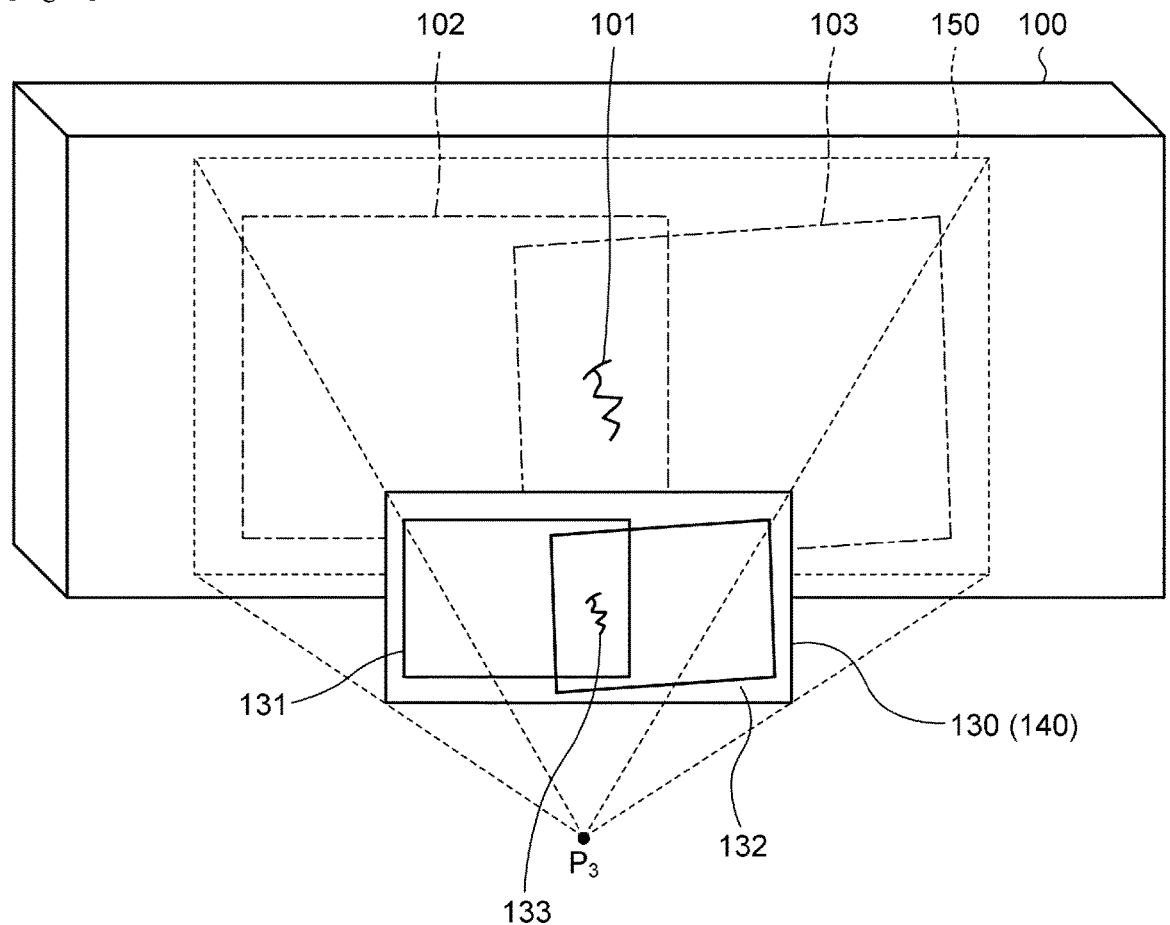
[Fig. 4A]
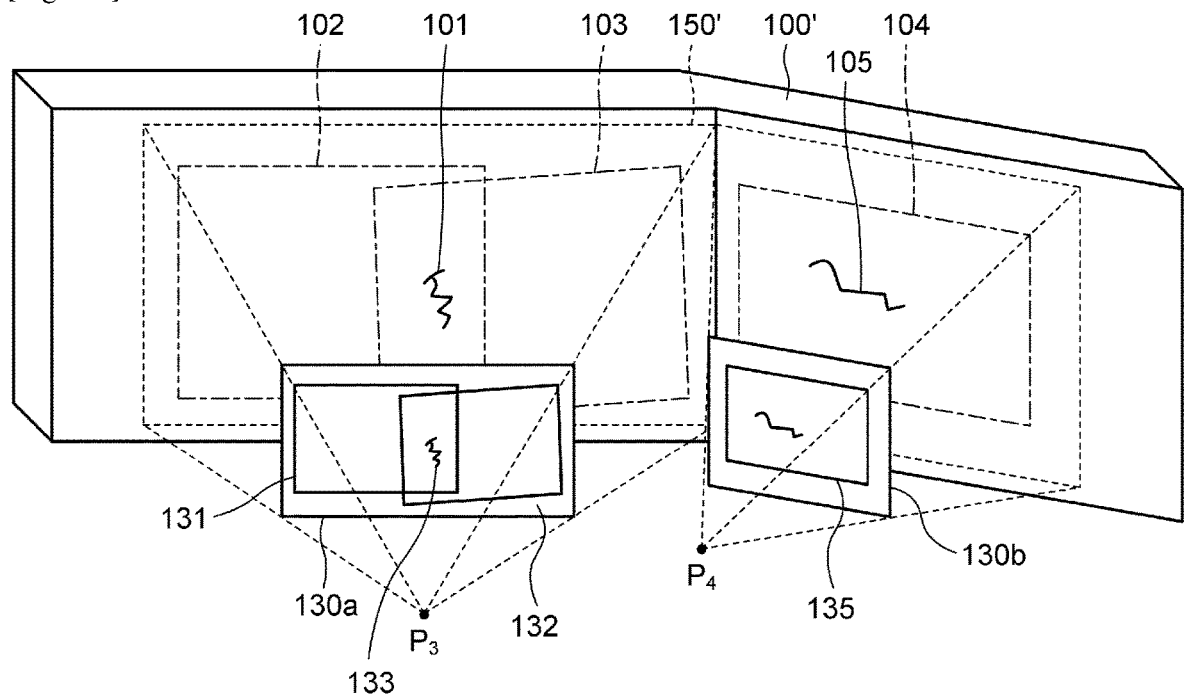

[Fig. 4B]
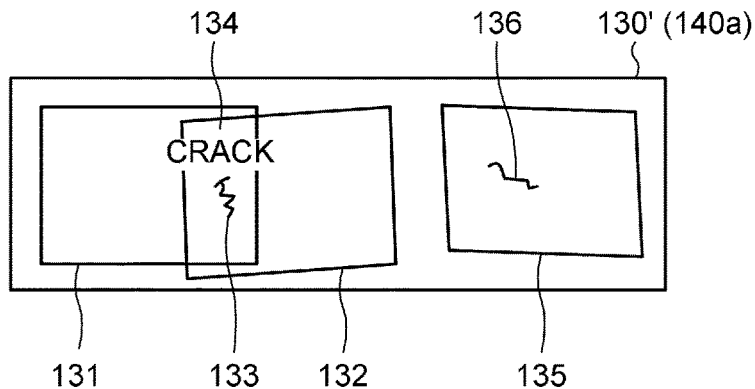
[Fig. 5]
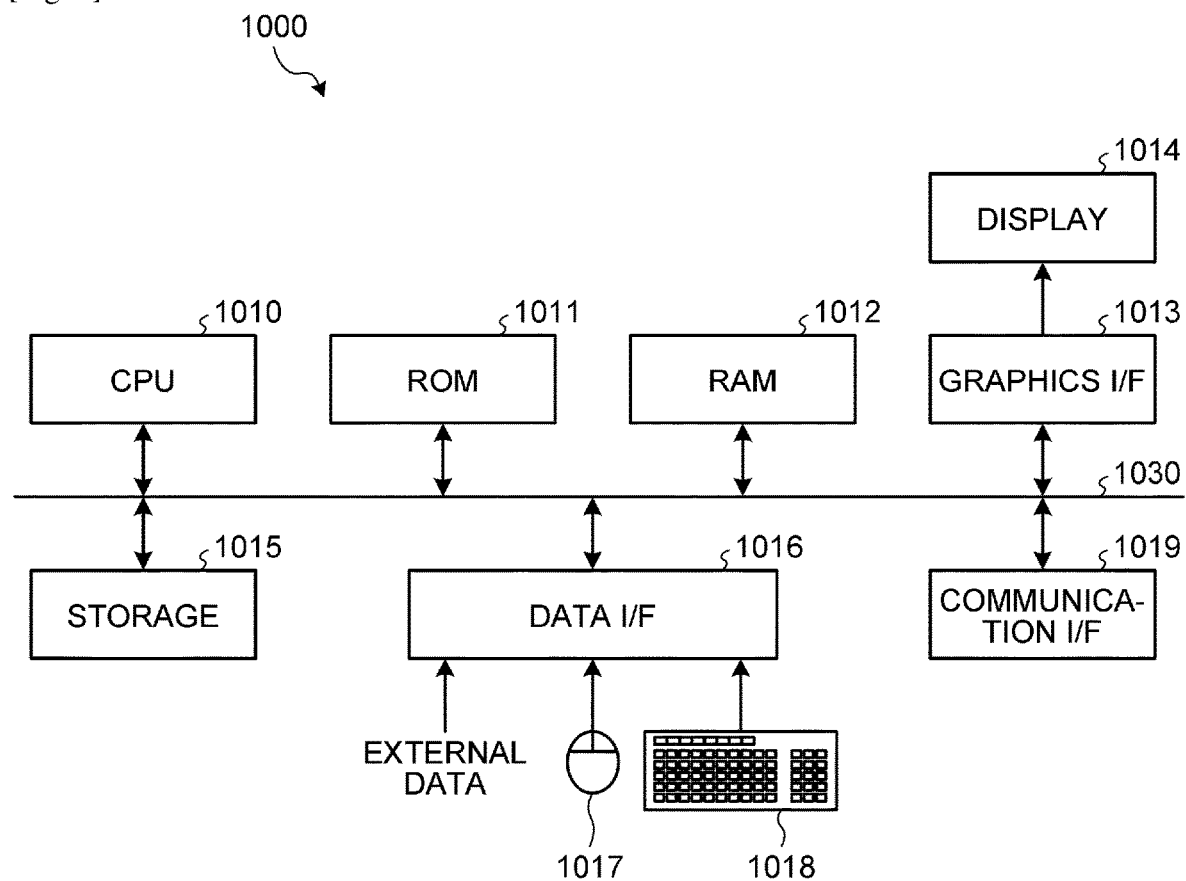

[Fig. 6A]
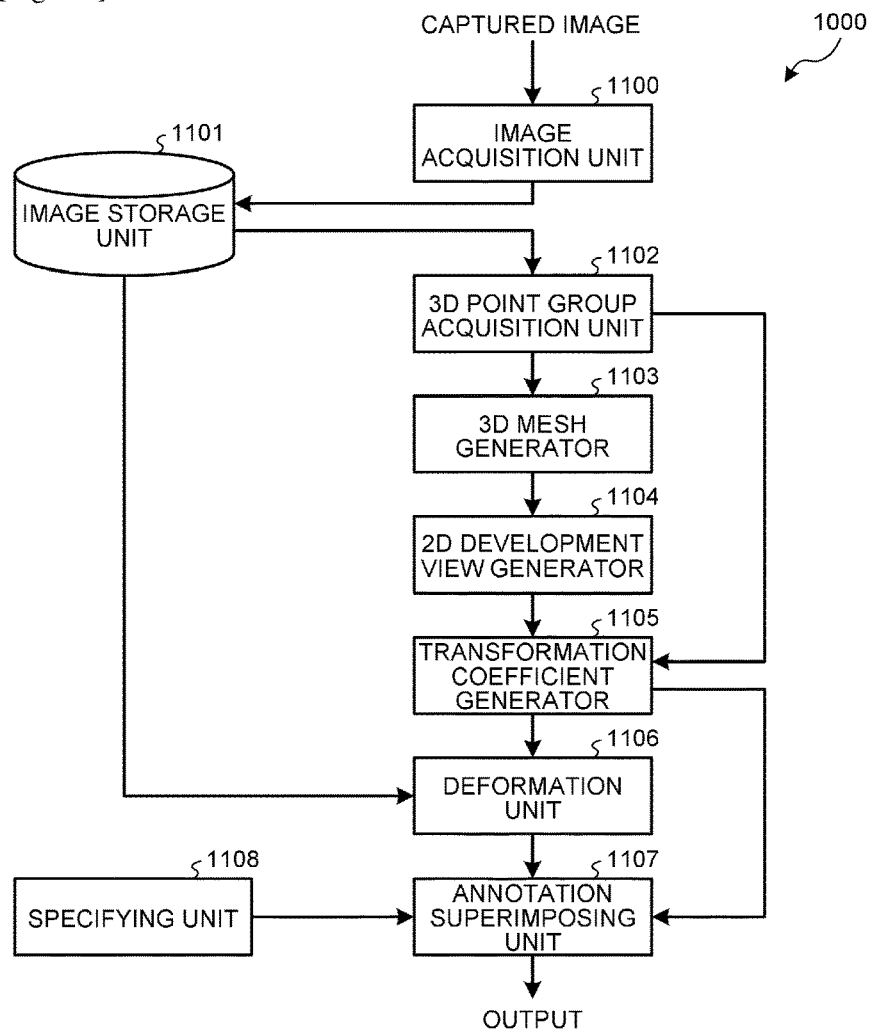
[Fig. 6B]
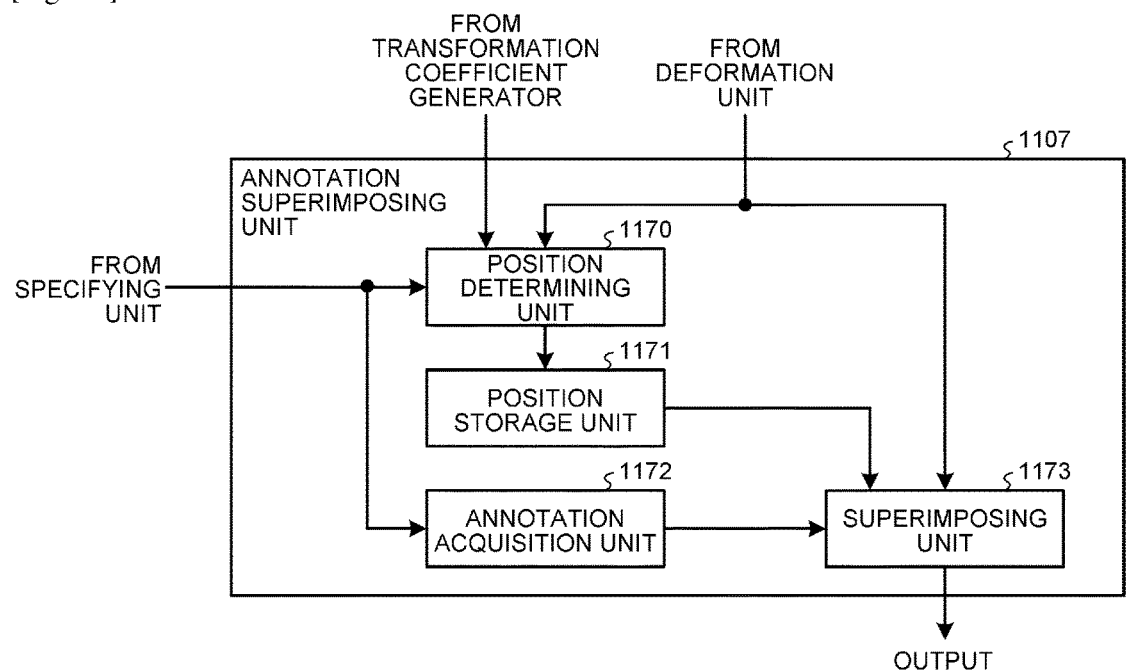

[Fig. 7]
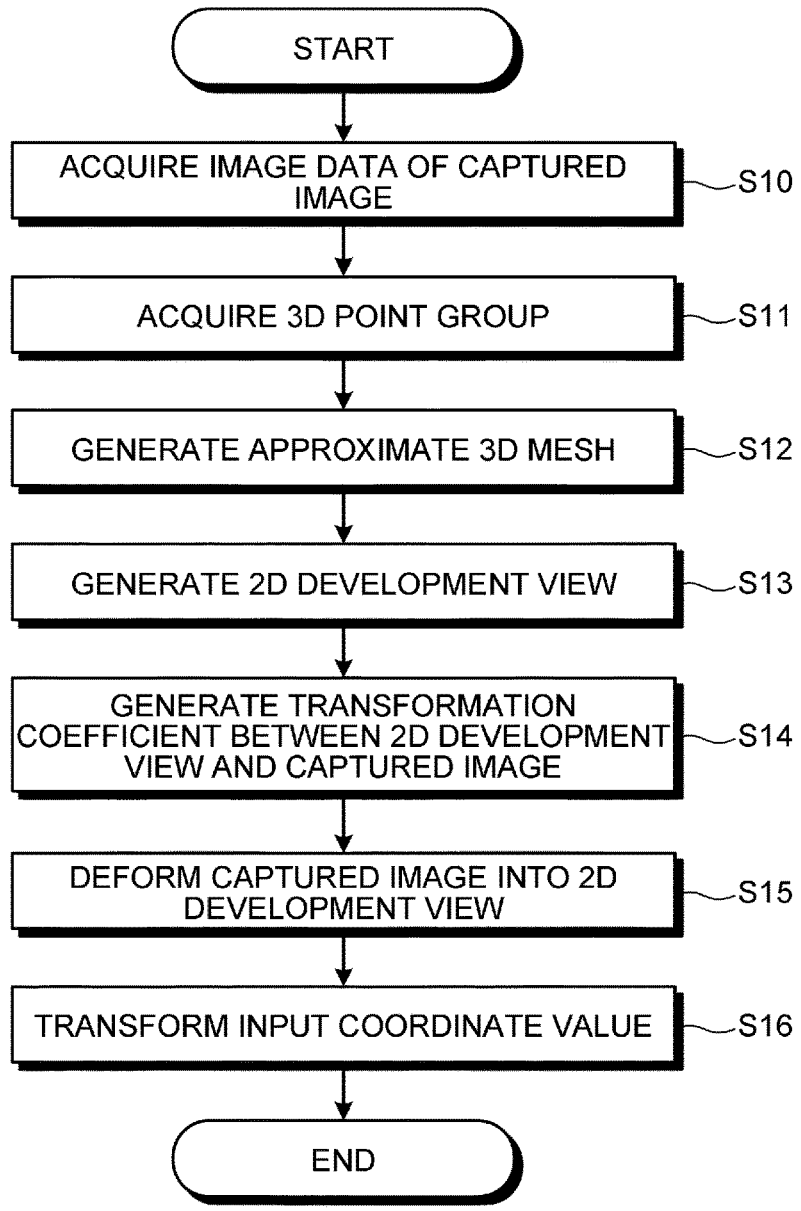
[Fig. 8A]
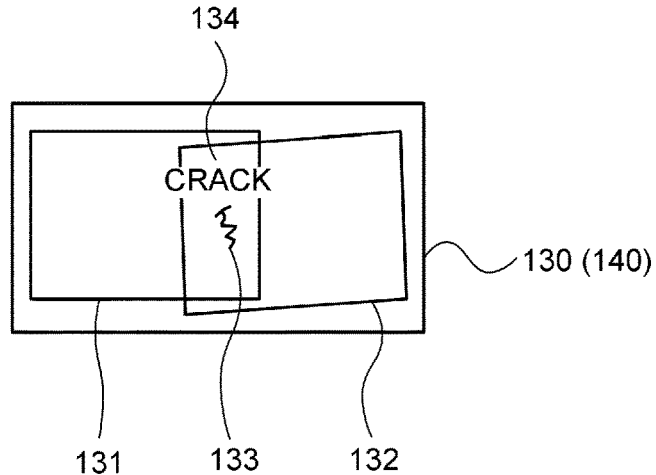

[Fig. 8B]
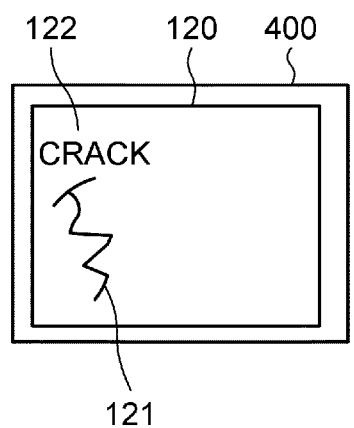
[Fig. 9]
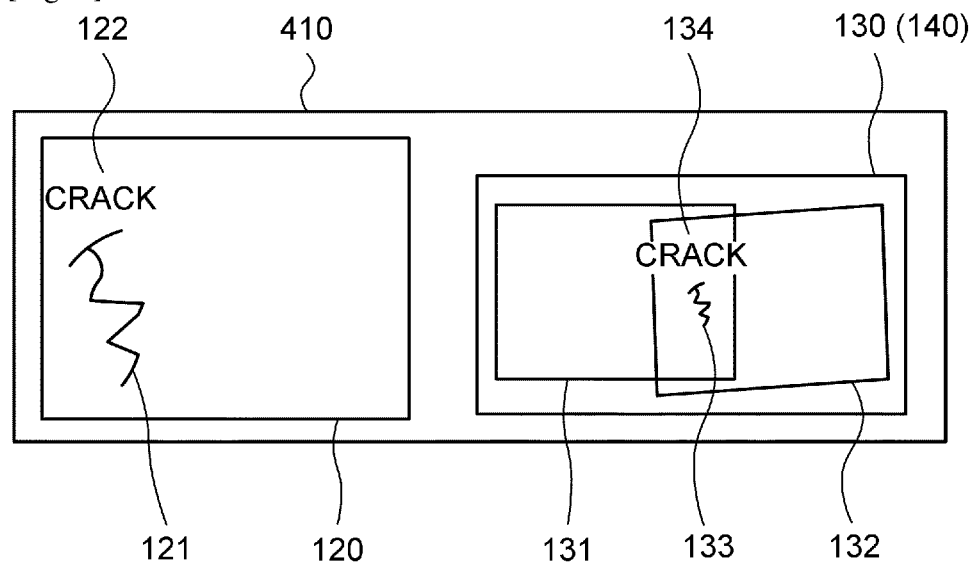

[Fig. 10A]
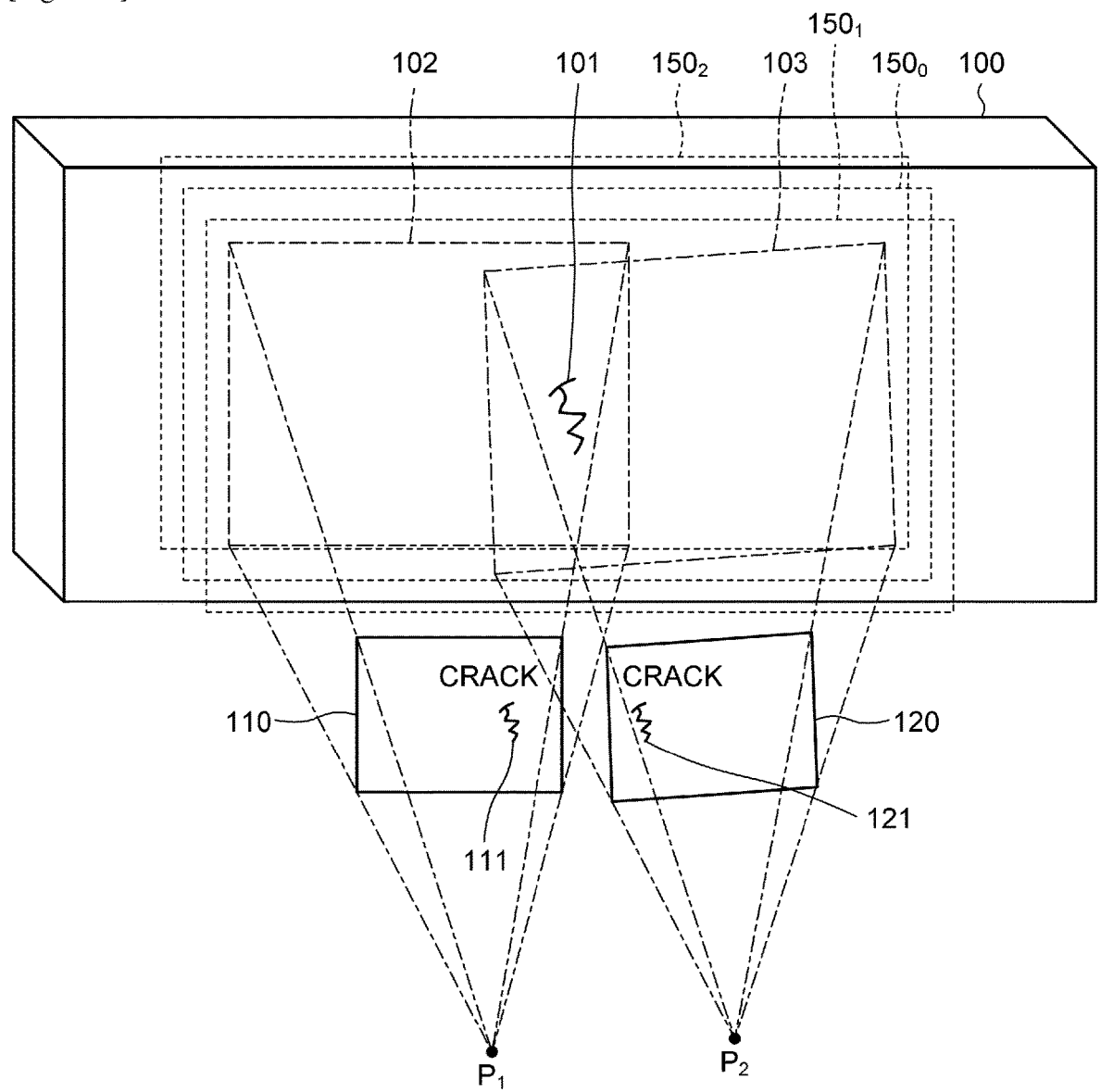
[Fig. 10B]
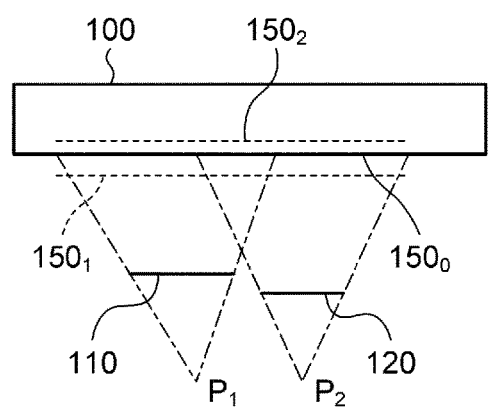

[Fig. 11A]
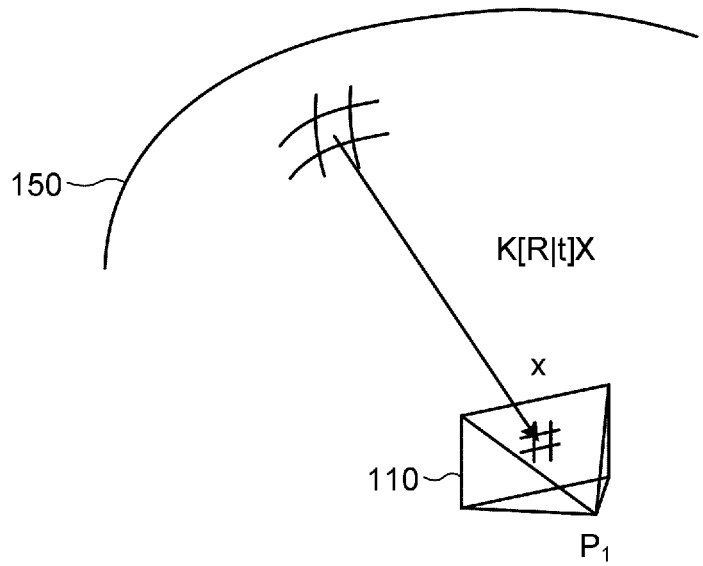
[Fig. 11B]
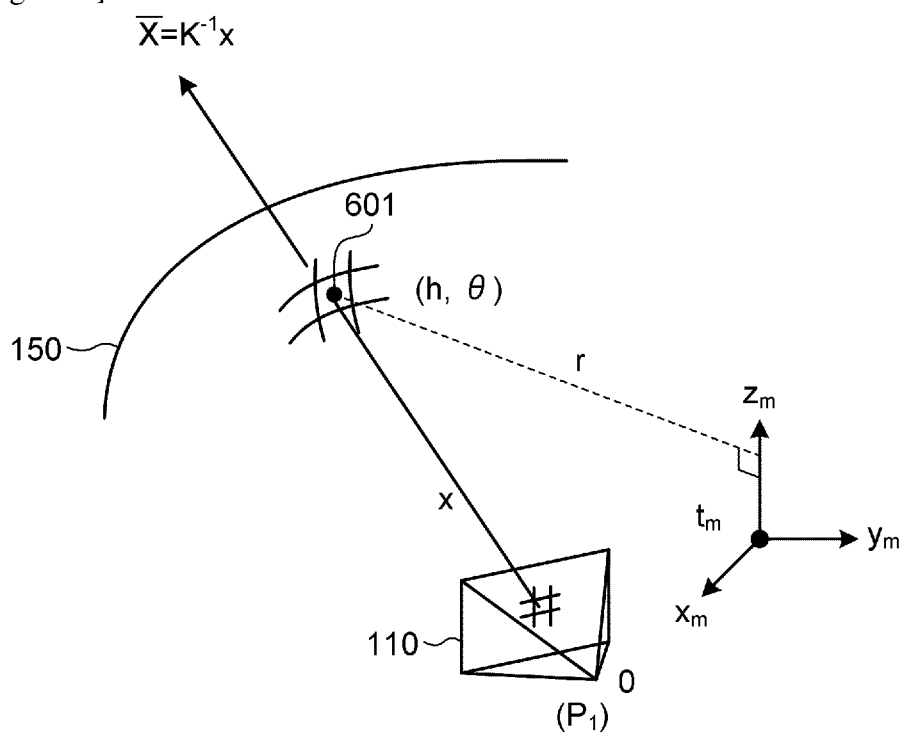

[Fig. 12]
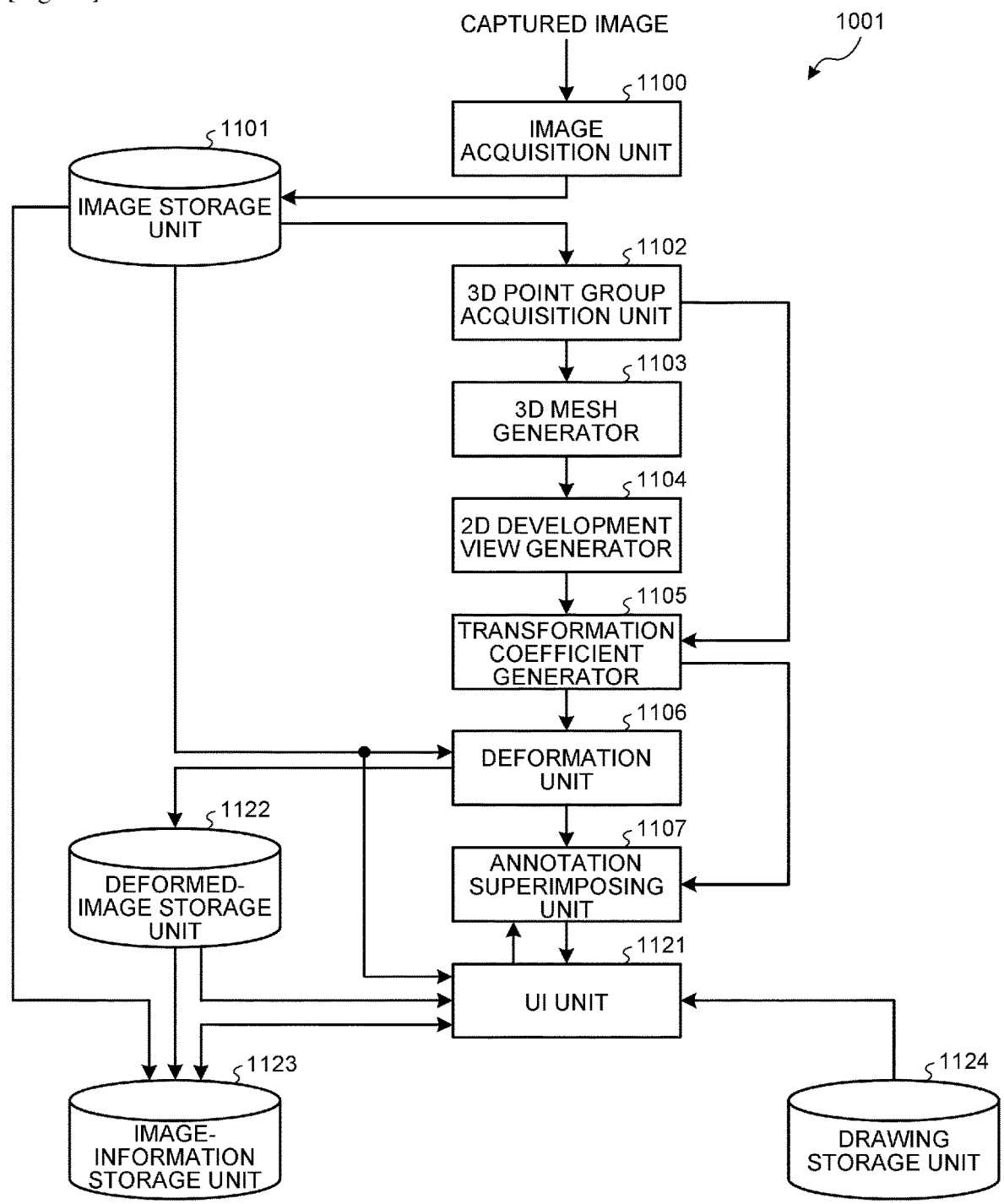

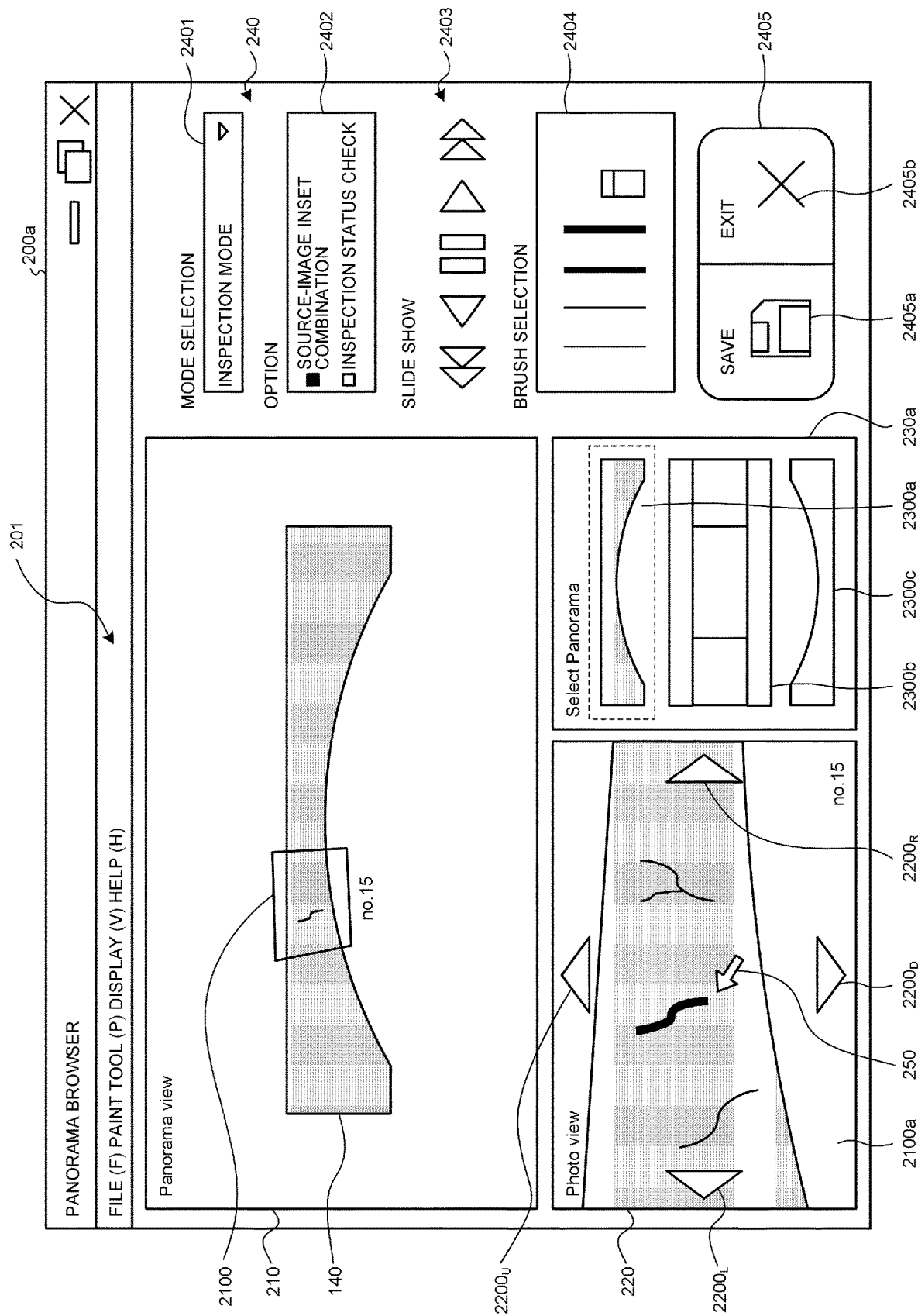
[Fig. 13]

[Fig. 14A]
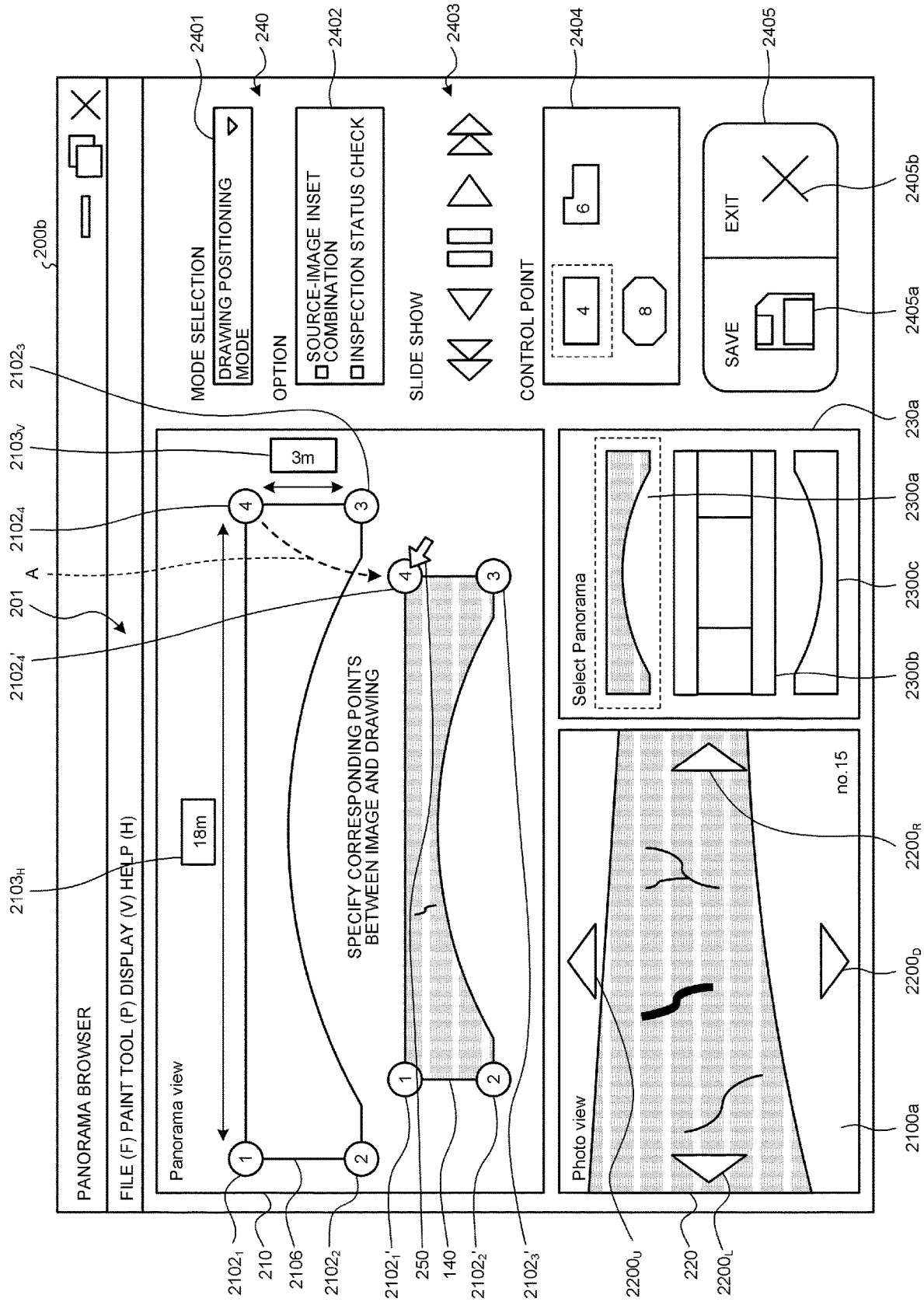

[Fig. 14B]
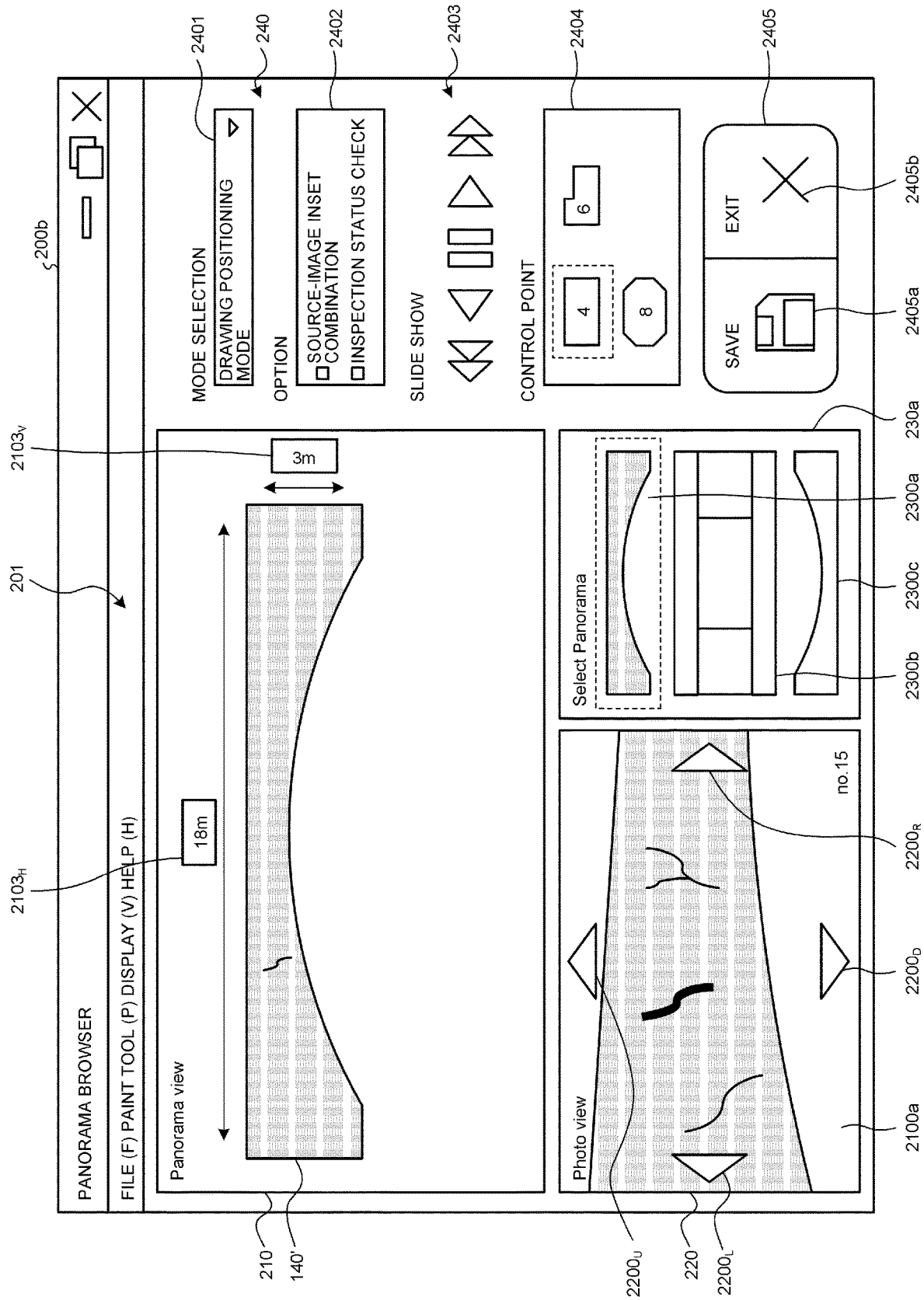

[Fig. 14C]
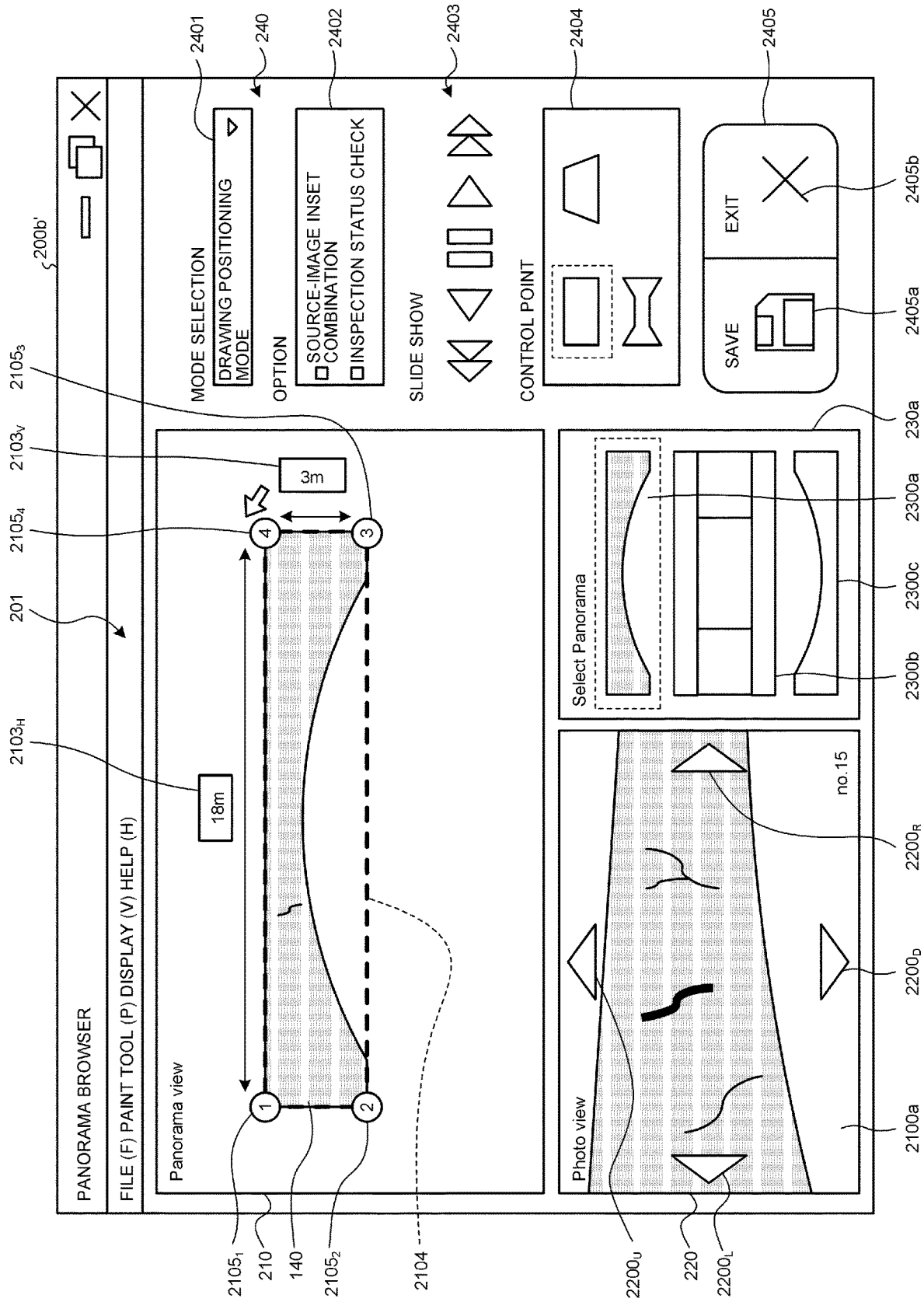

[Fig. 15]
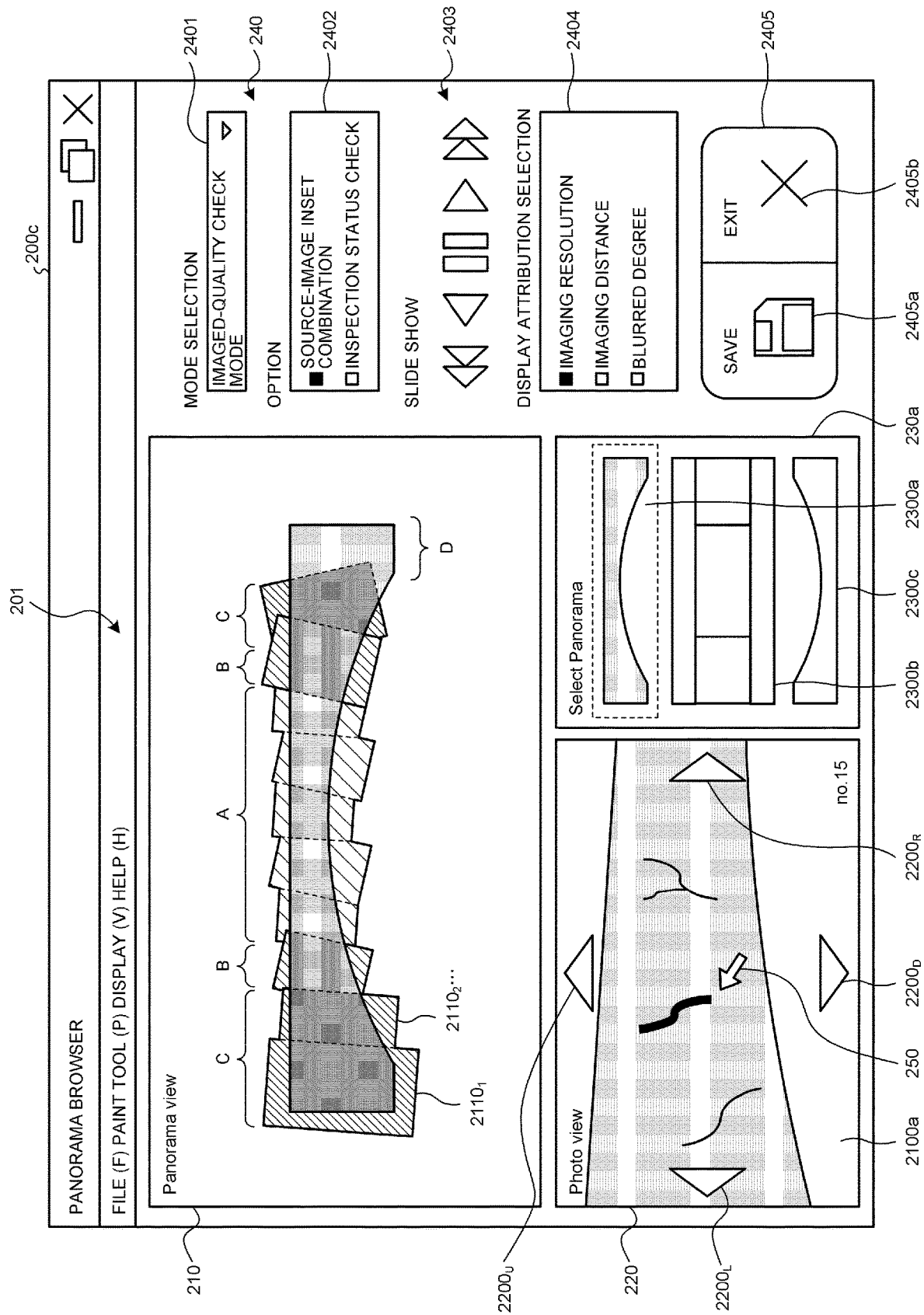

[Fig. 16]
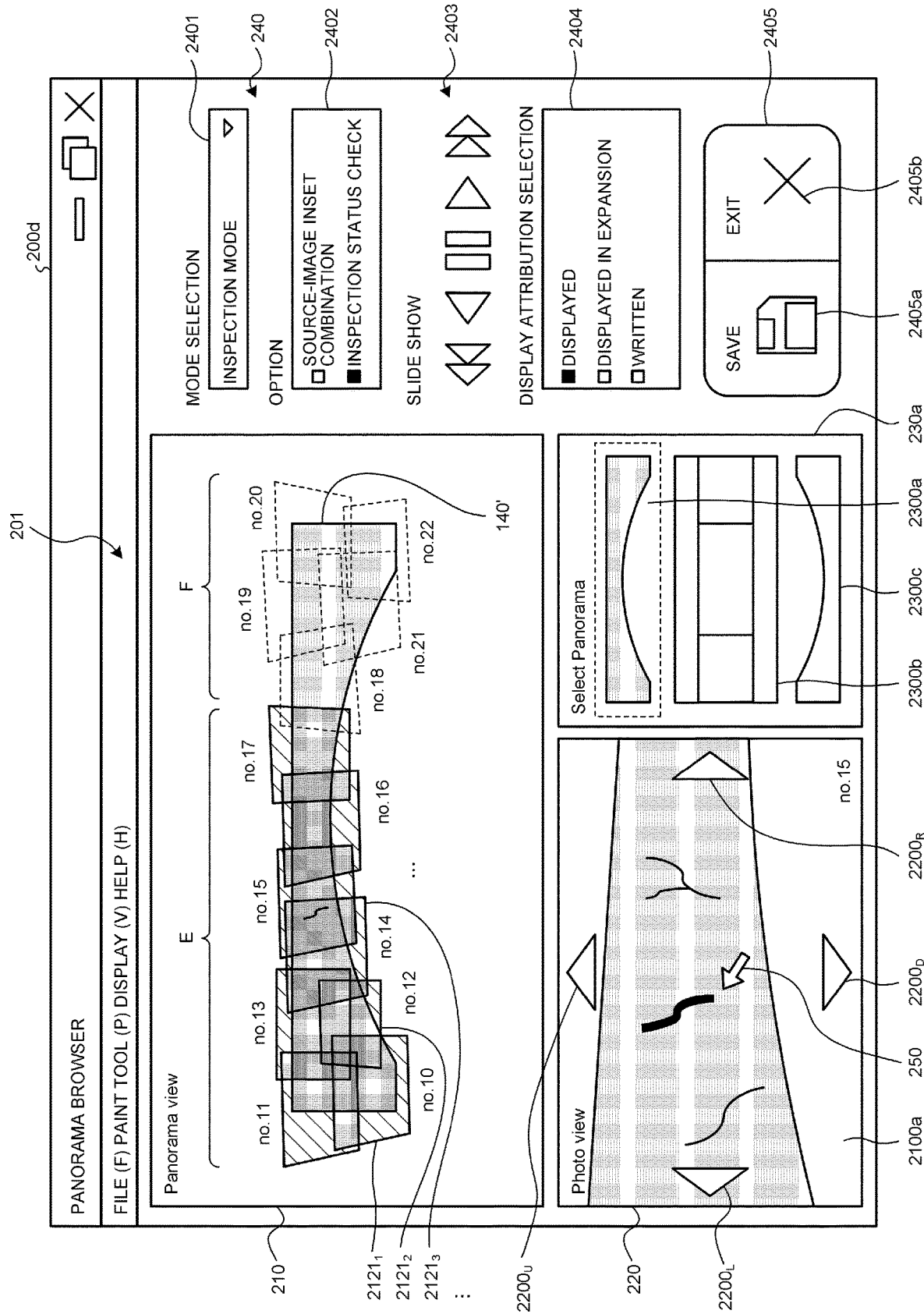

[Fig. 17]
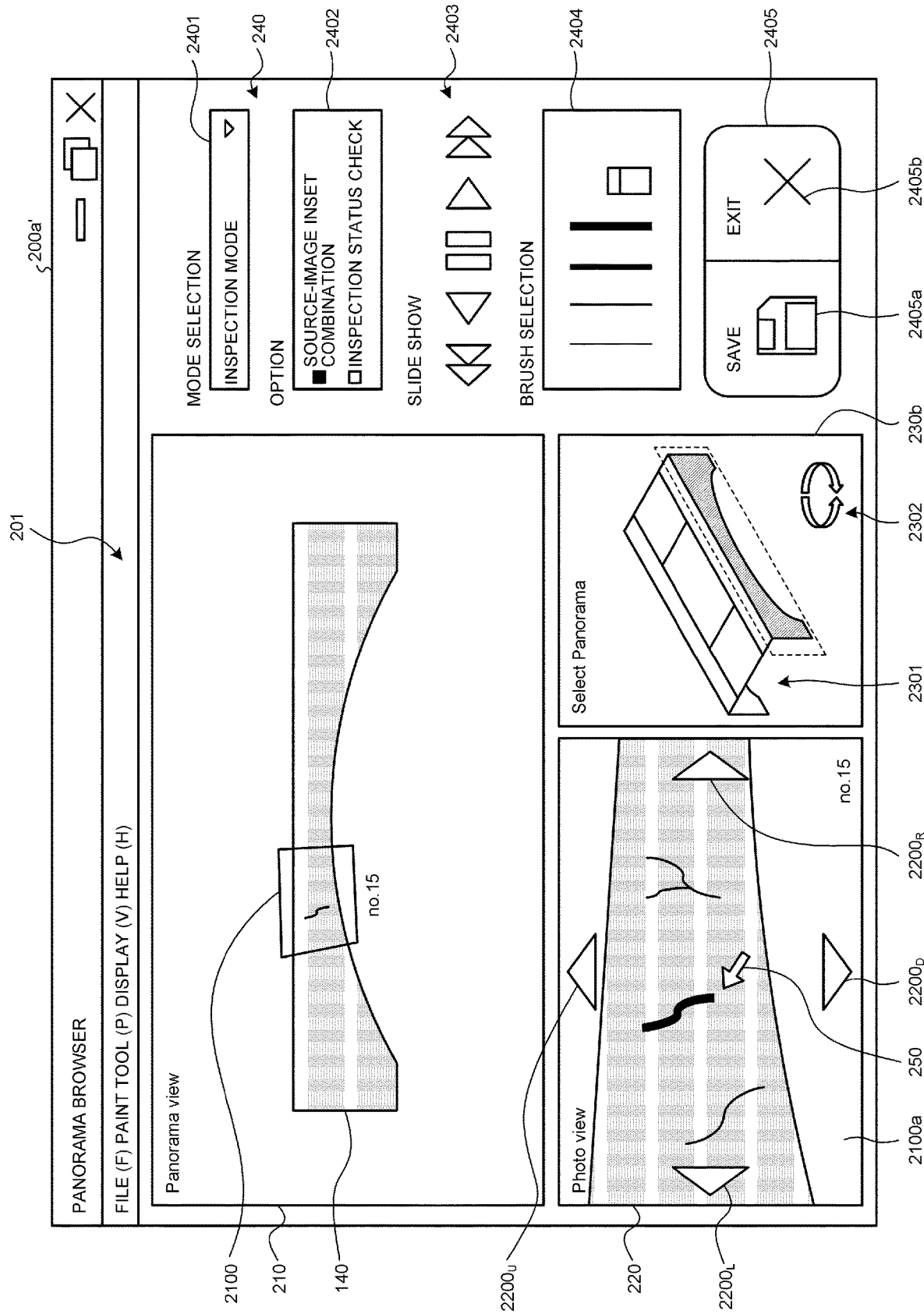

[Fig. 18]
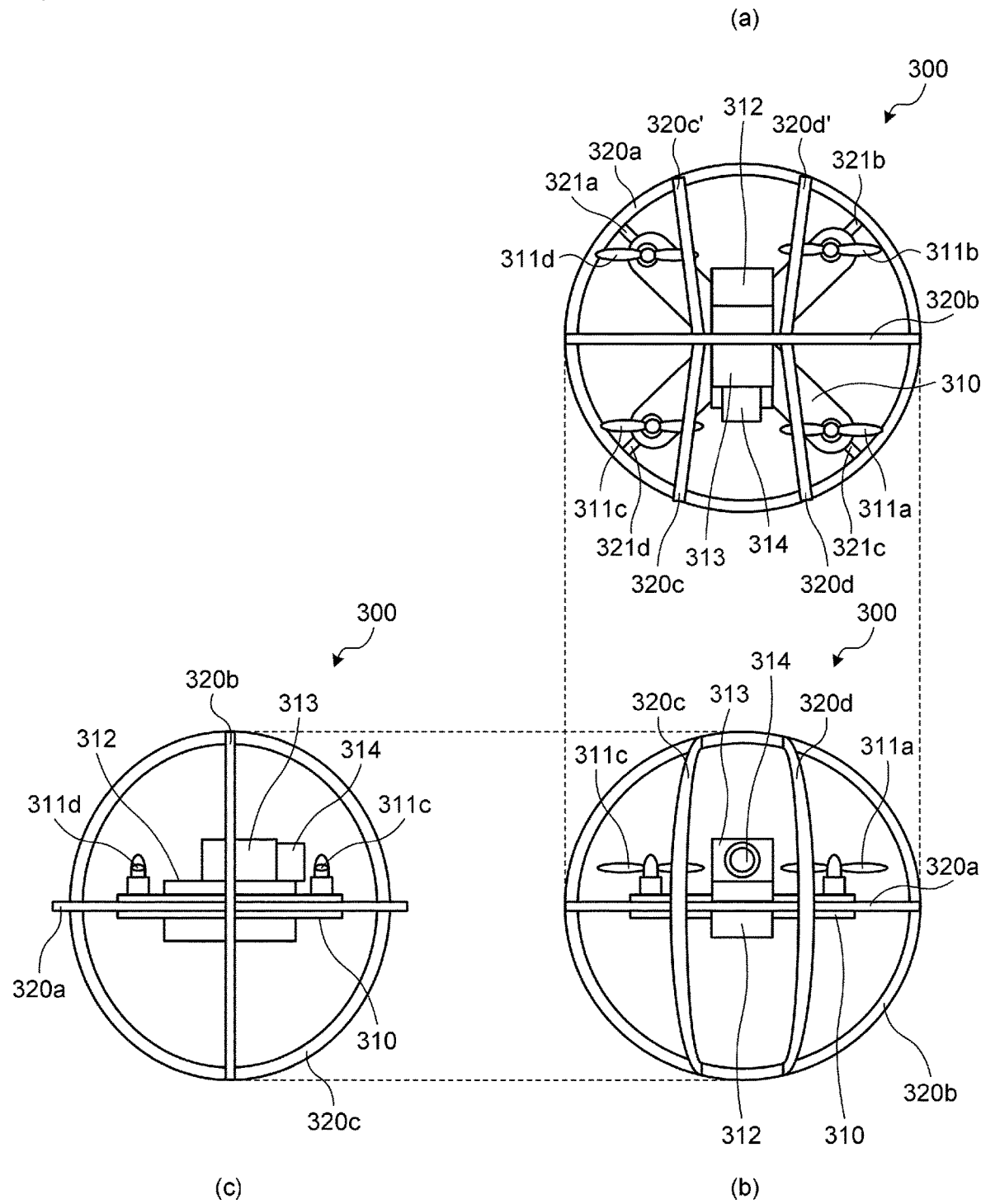

[Fig. 19A]
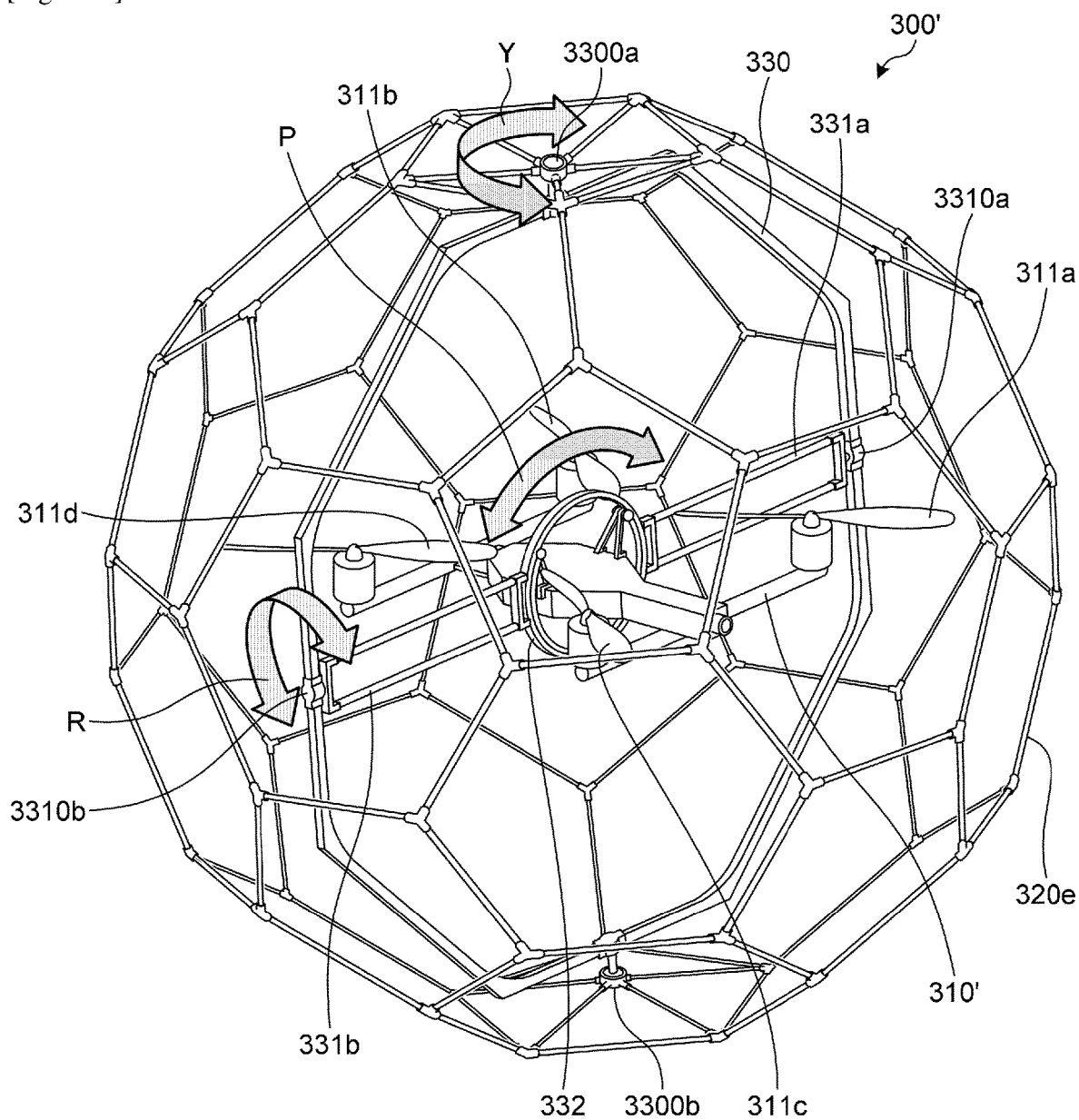
[Fig. 19B]
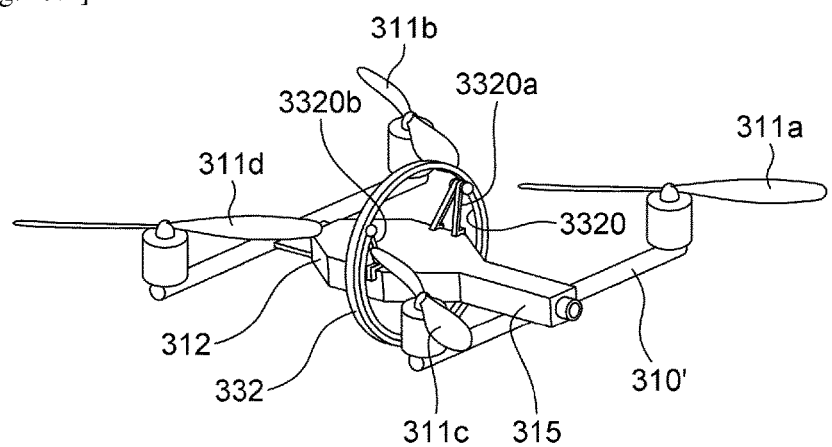

[Fig. 20]
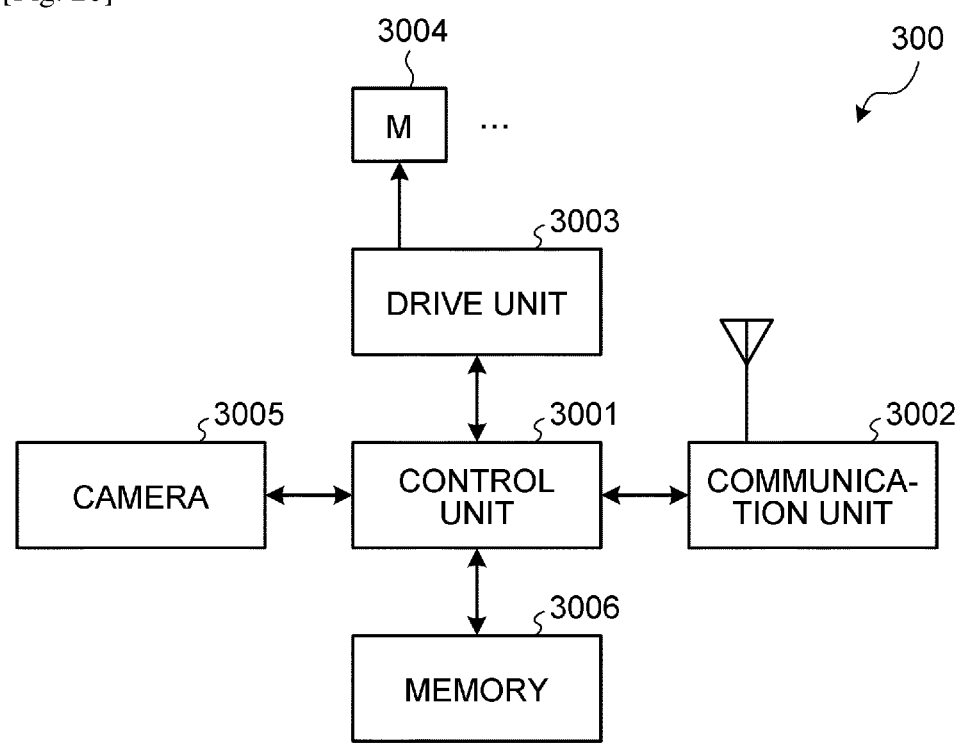

IMAGE PROCESSING METHOD, DISPLAY DEVICE, AND INSPECTION SYSTEM

TECHNICAL FIELD

The present invention relates to an image processing method, a display device, and an inspection system.

BACKGROUND ART

When inspecting a three-dimensional object substantially larger than a human such as a building structure, there has been a demand to take close-up photographs of an inspection object using a teleoperated robot or the like and to conduct inspection work by an inspector who is on the ground using the photographed images on which positioning has been carried out. Accordingly, a technique that creates a three-dimensional model using a plurality of photographed images, and that stores and displays an annotation that a user entered, in association with the three-dimensional model and the photographed images, has been known.

In Patent Literature 1, disclosed has been a technique in which an object (for example, a bounding box) that a user selected on two-dimensional images and contents that the user entered (for example, an annotation) are projected on a three-dimensional model and these object and contents are reflected in and displayed on other two-dimensional images obtained by photographing the same three-dimensional position. According to Patent Literature 1, it is possible for a user to create an annotation for a three-dimensional object in a three-dimensional model created from a plurality of images while viewing two-dimensional images.

SUMMARY OF INVENTION

Technical Problem

In the method of creating annotations using a three-dimensional model in the conventional technology, however, there is the need to browse the three-dimensional model from various directions in order to understand the total image, and thus there has been a problem in that the perspicuity is low. The problem of the perspicuity being low has not been eliminated even by Patent Literature 1.

The present invention has been made in view of the foregoing and an object thereof is to make it possible to view the information associated with a position specified on a three-dimensional model easily.

Solution to Problem

According to one aspect of the present invention, an image processing method includes generating a three-dimensional model including at least a part of a target object, from a plurality of two-dimensional images, approximating at least a part of the three-dimensional model by a three-dimensional mesh, determining a coefficient to transform the three-dimensional mesh into two-dimensional panoramic coordinates, determining a first image from a plurality of two-dimensional images corresponding to a portion of the two-dimensional panoramic coordinates, specifying contents to be projected onto the two-dimensional panoramic coordinates, and a first position on the first image, according to the first image, determining a second position corresponding to projection of the contents onto the two-dimensional panoramic coordinates, storing the second position and the contents in association with each other, superimposing the contents, as an annotation, on a second image obtained by projecting the first image onto the two-dimensional panoramic coordinates, determining a third image from the plurality of two-dimensional images, determining a third position corresponding to projection of the first position onto the third image, and projecting the contents at the third position on the third image to superimpose the contents as an annotation.

Advantageous Effects of Invention

The present invention has an effect in that the information associated with a position specified on a three-dimensional model can be viewed easily.

BRIEF DESCRIPTION OF DRAWINGS

FIG. 1A is a view for schematically explaining image processing performed by an image processing apparatus according to a first embodiment.

FIG. 1B is a view for schematically explaining the image processing.

FIG. 1C is a view for schematically explaining the image processing.

FIG. 1D is a view for schematically explaining the image processing.

FIG. 2 is a view for explaining a generating method of annotations in the first embodiment in more detail.

FIG. 3 is a view for explaining the generating method of annotations in the first embodiment in more detail.

FIG. 4A is a view for explaining the generating method of annotations in the first embodiment in more detail.

FIG. 4B is a view for explaining the generating method.

FIG. 5 is a block diagram illustrating an example of a hardware configuration of the image processing apparatus applicable in the first embodiment.

FIG. 6A is a functional block diagram for explaining one example of functions of the image processing apparatus in the first embodiment.

FIG. 6B is a functional block diagram for explaining the one example.

FIG. 7 is a flowchart illustrating one example of image processing in the first embodiment.

FIG. 8A is a view for explaining a display example of images and annotations in the first embodiment.

FIG. 8B is a view for explaining the display example.

FIG. 9 is a view for explaining a display example of images and annotations in the first embodiment.

FIG. 10A is a view for explaining the adjustment of the position of a three-dimensional mesh in the first embodiment.

FIG. 10B is a view for explaining the adjustment.

FIG. 11A is a view for explaining the processing of transforming the three-dimensional mesh into a two-dimensional development view in the first embodiment.

FIG. 11B is a view for explaining the processing.

FIG. 12 is a functional block diagram for explaining one example of functions of an image processing apparatus according to a second embodiment.

FIG. 13 is a view illustrating a first example of a UI screen in the second embodiment.

FIG. 14A is a view illustrating a second example of the UI screen in the second embodiment.

FIG. 14B is a view illustrating the second example of the UI screen in the second embodiment.

FIG. 14C is a view illustrating the second example of the UI screen in the second embodiment.

FIG. 15 is a view illustrating a third example of the UI screen in the second embodiment.

FIG. 16 is a view illustrating a fourth example of the UI screen in the second embodiment.

FIG. 17 is a view illustrating a fifth example of the UI screen in the second embodiment.

FIG. 18 is a trihedral view schematically illustrating an example of the appearance of an imaging apparatus according to a third embodiment.

FIG. 19A is a view illustrating an example of an imaging apparatus using a three-axis gimbal applicable in the third embodiment.

FIG. 19B is a view illustrating the example.

FIG. 20 is a block diagram illustrating one example of the configuration of the imaging apparatus in the third embodiment.

DESCRIPTION OF EMBODIMENTS

With reference to the accompanying drawings, the following describes exemplary embodiments of an image processing method, a display device, and an inspection system in detail.

Outline of Processing in First Embodiment

FIGS. 1A to D are view for schematically explaining image processing performed by an image processing apparatus according to a first embodiment. In FIG. 1A, an object 100 is a building structure such as a bridge, for example, and includes a crack 101. An observer (for example, an inspector of the bridge) of the object 100, in order to observe (inspect) the state of the crack 101 that is an observation object, photographs the crack 101 from different observation points and obtains a plurality of captured images as two-dimensional images.

FIG. 1B illustrates two images 110 and 120 based on captured images in which the crack 101 from different observation points is imaged. The images 110 and 120 respectively include an image of a range of areas 102 and 103 of the object 100. In the images 110 and 120, an object that is an image corresponding to the crack 101 is included at respective positions of coordinate values 111 and 121.

The image processing apparatus in the first embodiment generates, as schematically illustrated in FIG. 1C, a three-dimensional mesh 150 that approximates at least a part of the object 100 based on the images 110 and 120. The three-dimensional mesh 150 can be a plane surface that approximates one surface of the object 100, for example. Furthermore, as illustrated in FIG. 1D, the image processing apparatus in the first embodiment generates a two-dimensional development view 130 obtained by deploying the three-dimensional mesh on a two-dimensional plane. The two-dimensional development view 130 is a diagram obtained by transforming each sub-plane that the three-dimensional mesh 150 includes such that the sub-plane is projected orthographically.

In FIG. 1D, images 131 and 132 are images obtained by performing coordinate transformation on the images 110 and 120 to the two-dimensional development view 130. The image processing apparatus in the first embodiment can combine the images 131 and 132 based on coordinate values 111 and 121, and form a panoramic image 140. The panoramic image 140 and the two-dimensional development view 130 include an object corresponding to the coordinate values 111 and 121 at the position of a coordinate value 133 for which the coordinate values 111 and 121 included in the images 110 and 120 are made to match.

The image processing apparatus in the first embodiment, according to user operation, can input the coordinate value 111 of the object and text 112 while the user is referring to the image 110 (first image) (see FIG. 1B), for example. The text 112 is the contents that indicate an annotation for the object. The text 112 is not limited to character information and may be an icon image or a hand-drawn image. Furthermore, the image processing apparatus in the first embodiment can determine a coordinate value in another image corresponding to the entered coordinate value. The image processing apparatus transforms the coordinate value 111 of the object included in the image 110 into a coordinate value on the two-dimensional development view 130 as the other image, for example.

In another first embodiment, the coordinate value 133 of the object and the text 134 can be input while the user is referring to the image 131 for which coordinate transformation is performed with respect to the two-dimensional development view 130 (see FIG. 1D), for example. The relevant image processing apparatus transforms the coordinate value 133 of the object included in the image 131 into a coordinate value on the captured image 130 as the other image, for example.

The image processing apparatus in the first embodiment can store the entered text 112 in association with the coordinate value in the other image corresponding to the coordinate value 111 of the object. The image processing apparatus can store the text 112 in asspcoation with the coordinate value 133 of the object in the two-dimensional development view 130, for example.

The stored annotation can be displayed being superimposed on the other image that has panoramic coordinates (image 120, image 132, panoramic image 140) as a second image, for example. In the example in FIG. 1B, for example, the text 112 entered for the coordinate value 111 of the object in the image 110 is displayed as text 122 for the coordinate value 121 of an object corresponding to the object of the coordinate value 111 in the image 120 as the other image, and annotation display is made. In the example in FIG. 1D, the text 112 is displayed being superimposed as the text 134 for the two-dimensional development view 130 at the position corresponding to the coordinate value 133.

With reference to FIGS. 2 to 4, a generating method of annotations in the first embodiment will be described in more detail. In FIGS. 2 to 4, the portions that are common to the above-described FIGS. 1A to 1D are denoted by the identical reference signs and the detailed descriptions thereof are omitted. The image processing apparatus in the first embodiment generates respective annotations on the images 110 and 120 from the captured images, and on the two-dimensional development view 130 for which the three-dimensional mesh 150, which is generated based on the captured images and approximates at least a part of the observation object, is deployed on the two-dimensional plane.

FIGS. 2 and 3 are diagrams for explaining the processing of transforming the coordinate value in an image into the coordinate value in another image. In FIG. 2, the images 110 and 120 are based on the captured images imaged from observation points $P_1$ and $P_2$ different from each other. In the example in FIG. 2, the coordinate value 111 of the object in the image 110 is transformed into the coordinate value 121 in the image 120 as the other image.

In FIG. 3, the image processing apparatus in the first embodiment, virtually, transforms the images 110 and 120 once into the three-dimensional mesh 150, and subsequently, transforms the three-dimensional mesh 150 into the two-dimensional development view 130. As for the actual processing, the image processing apparatus omits the process of transformation into the three-dimensional mesh 150, and the image processing apparatus transforms the images 110 and 120 directly into the two-dimensional development view 130 and forms the images 131 and 132. Similarly, the image processing apparatus determines the coordinate value 133 in the two-dimensional development view 130 corresponding to the coordinate value 111 directly without going through the process of transformation into the three-dimensional mesh 150. This applies also to the example in FIG. 2.

As illustrated in FIG. 3, the two-dimensional development view 130 or the panoramic image 140 corresponding to the two-dimensional development view 130 is equivalent to the case in which the object 100 is observed from an observation point $P_3$.

FIGS. 4A and 4B illustrate another example of transforming a three-dimensional mesh into a two-dimensional development view in the first embodiment. In the example in FIG. 4A, in an object 100', a portion for which the angle viewed from the observer is different has been added to the above-described object 100, and a scratch 105 is present in the additional portion. In FIG. 4A, a two-dimensional development view 130b is generated corresponding to an image 135, which is based on a captured image imaged from an observation point $P_4$, based on a three-dimensional mesh 150' generated using captured images in which areas 102, 103, and 104 are imaged. A two-dimensional development view 130a corresponds to the above-described two-dimensional development view 130.

FIG. 4B illustrates an example of a two-dimensional development view 130' generated from the three-dimensional mesh 150'. The two-dimensional development view 130' includes the two-dimensional development views 130a and 130b illustrated in FIG. 4B. The image processing apparatus in the first embodiment transforms the three-dimensional mesh 150' into a two-dimensional development view while the shapes and relative areas of the respective sub-planes that are included in the three-dimensional mesh 150' are kept retained, to generate the two-dimensional development view 130'. The image processing apparatus in the first embodiment can generate a panoramic image 140a including the images 131, 132, and 135 based on the two-dimensional development view 130'. In the image 135, at the position corresponding to a coordinate value 136, an image of the scratch 105 is displayed.

Configuration Example of Image Processing Apparatus in First Embodiment

FIG. 5 illustrates an example of a hardware configuration of an image processing apparatus applicable in the first embodiment. In FIG. 5, an image processing apparatus 1000 includes a central processing unit (CPU) 1010, a read only memory (ROM) 1011, a random access memory (RAM) 1012, a graphics I/F 1013, a storage 1015, a data I/F 1016, and a communication I/F 1019, and these various units are connected via a bus 1030 so as to be able to communicate with one another. As just described, the image processing apparatus 1000 in the first embodiment can be implemented using a common computer.

The storage 1015 is a non-volatile storage medium such as a hard disk drive and a flash memory, and programs and data are stored therein. The CPU 1010 controls the overall operation of the image processing apparatus 1000 in accordance with the programs stored in the storage 1015 and the ROM 1011 using the RAM 1012 as a work memory.

The graphics I/F 1013 connects with a display 1014 and generates, based on display control information generated in accordance with the program by the CPU 1010, a display signal that the display 1014 can display. The data I/F 1016 is an interface for external data supplied from the outside of the image processing apparatus 1000. The data I/F 1016 can connect a pointing device 1017 such as a mouse, and a keyboard 1018. As for the data I/F 1016, a universal serial bus (USB) can be applied, for example.

The communication I/F 1019 connects to a network and performs communication via the network. The network may be a local area network (LAN) or may be the Internet. The network may be connected using any of wired-communication and wireless communication.

FIGS. 6A and 6B are functional block diagrams for explaining one example of functions of the image processing apparatus 1000 in the first embodiment. In FIG. 6A, the image processing apparatus 1000 includes an image acquisition unit 1100, an image storage unit 1101, a 3D point group acquisition unit 1102, a 3D mesh generator 1103, a 2D development view generator 1104, a transformation coefficient generator 1105, a deformation unit 1106, an annotation superimposing unit 1107, and a specifying unit 1108.

Of the foregoing, the image acquisition unit 1100, the 3D point group acquisition unit 1102, the 3D mesh generator 1103, the 2D development view generator 1104, the transformation coefficient generator 1105, the deformation unit 1106, the annotation superimposing unit 1107, and the specifying unit 1108 are configured by a computer program that operates on the CPU 1010. This is not a limitation and a part of or the whole of the image acquisition unit 1100, the 3D point group acquisition unit 1102, the 3D mesh generator 1103, the 2D development view generator 1104, the transformation coefficient generator 1105, the deformation unit 1106, the annotation superimposing unit 1107, and the specifying unit 1108 may be configured by hardware circuits that collaboratively operate with one another. The image storage unit 1101 is configured by a certain storage area in the storage 1015 or the RAM 1012.

An image processing program to implement the functions of the image processing apparatus 1000 in the first embodiment is recorded into and provided in a computer-readable recording medium such as a compact disc (CD), a flexible disk (FD), and a digital versatile disc (DVD), as an installable or executable file. This is not a limitation and the information processing program may be stored in a computer connected to a network such as the Internet and be downloaded via the network to provide the information processing program. The information processing program may be provided or distributed via a network such as the Internet.

The image processing program is in a module configuration including the above-described units (the image acquisition unit 1100, the 3D point group acquisition unit 1102, the 3D mesh generator 1103, the 2D development view generator 1104, the transformation coefficient generator 1105, the deformation unit 1106, the annotation superimposing unit 1107, and the specifying unit 1108). As for the actual hardware, the CPU 1010 reads out and executes the image processing program from the storage medium such as the storage 1015 so that the above-described units are loaded on a main storage device such as the RAM 1012, and the image acquisition unit 1100, the 3D point group acquisition unit 1102, the 3D mesh generator 1103, the 2D development view generator 1104, the transformation coefficient generator 1105, the deformation unit 1106, the annotation superimposing unit 1107, and the specifying unit 1108 are generated on the main storage device.

In FIGS. 6A and 6B, the image acquisition unit 1100 acquires a captured image. The captured image is imaged by a camera so as to include an observation object, and is input to the image processing apparatus 1000 from the data I/F 1016, for example. The image acquisition unit 1100 stores the acquired captured image into the image storage unit 1101 in association with the identification information that identifies the captured image.

The 3D point group acquisition unit 1102 acquires, based on a plurality of captured images stored in the image storage unit 1101, a three-dimensional point group that is the aggregate of points having three-dimensional information. The 3D mesh generator 1103 generates, based on the three-dimensional point group acquired by the 3D point group acquisition unit 1102, the three-dimensional mesh 150. The 2D development view generator 1104 generates, based on the three-dimensional mesh 150 generated by the 3D mesh generator 1103, the two-dimensional development view 130.

The transformation coefficient generator 1105 generates a transformation coefficient for performing coordinate transformation between the two-dimensional development view 130 and images. For example, the transformation coefficient generator 1105 generates the transformation coefficient based on the images (for example, the images 110 and 120) used in acquiring the three-dimensional point group by the 3D point group acquisition unit 1102, and the two-dimensional development view 130 generated by the 2D development view generator 1104.

The deformation unit 1106 deforms images (for example, the images 110 and 120) stored in the image storage unit 1101 using the transformation coefficient generated by the transformation coefficient generator 1105. The deformation unit 1106 can further combine a plurality of deformed images (for example, the images 131 and 132) and apply the combined deformed images to panoramic coordinates to generate the panoramic image 140.

The annotation superimposing unit 1107 superimposes, in accordance with the coordinate values specified by the specifying unit 1108, the text (annotation) specified by the specifying unit 1108 on any of the images (for example, the images 131 and 132) deformed by the deformation unit 1106 and the two-dimensional development view (for example, the two-dimensional development view 130) generated by the 2D development view generator 1104 and outputs the text. The output of the annotation superimposing unit 1107 is supplied to the display 1014 via the graphics I/F 1013 and is displayed on a screen of the display 1014, for example.

The specifying unit 1108 specifies the text 112 which is an annotation, and the coordinate value 111 for displaying the annotation, in accordance with information input using the pointing device 1017 and the keyboard 1018. This is not a limitation and the specifying unit 1108 may specify the text 112 and the coordinate value 111, depending on the result of analysis performed on images stored in the image storage unit 1101 using other programs executed on the CPU 1010, for example.

FIG. 6B is a functional block diagram for explaining one example of the functions of the annotation superimposing unit 1107. The annotation superimposing unit 1107 includes a position determining unit 1170, a position storage unit 1171, an annotation acquisition unit 1172, and a superimposing unit 1173.

The position determining unit 1170 receives an image or a two-dimensional development view supplied from the deformation unit 1106, and the coordinate values specified by the specifying unit 1108. The position determining unit 1170 further receives a transformation coefficient generated by the transformation coefficient generator 1105. The position determining unit 1170 determines, based on the received transformation coefficient, the coordinate values on the image or the two-dimensional development view corresponding to the specified coordinate values. The position storage unit 1171 stores therein the coordinate values determined by the position determining unit 1170. The position storage unit 1171 is configured using a certain area in the storage area of the storage 1015, for example.

The annotation acquisition unit 1172 acquires the text specified as the annotation by the specifying unit 1108. The annotation acquisition unit 1172 stores the acquired text into a certain area in the storage area of the storage 1015, for example.

The superimposing unit 1173 receives the image or the two-dimensional development view from the deformation unit 1106. The superimposing unit 1173 superimposes the text acquired by the annotation acquisition unit 1172 on the image or the two-dimensional development view received from the deformation unit 1106, in accordance with the coordinate value stored by the position storage unit 1171, and outputs the text.

FIG. 7 is a flowchart illustrating one example of image processing in the first embodiment. At Step S10, the image acquisition unit 1100 acquires image data (for example, the images 110 and 120) by the captured images in which an observation object is imaged. At this time, the image acquisition unit 1100 acquires each image of a plurality of captured images in which the observation object is imaged from different observation points. The captured images are imaged so as to have overlapping portions in the imaged areas between a first captured image, and a second captured image of the vicinity of the first captured image. The image acquisition unit 1100 stores the acquired image data into the image storage unit 1101. In the following description, unless otherwise noted specifically, the image data that the image acquisition unit 1100 acquired is referred to as images.

For example, when the observation object is a bridge, the images that the image acquisition unit 1100 acquires are the images by a plurality of photographic images in which the bridge is imaged from different points in the air. The observation object, however, is not limited to bridges, and may be other building structures, or may be other objects, not being limited to a building structure. It is preferable that the images that the image acquisition unit 1100 acquires be the images in which the distortion due to lens has been corrected.

At the next Step S11, the 3D point group acquisition unit 1102 acquires three-dimensional point group that includes at least a part of the observation object. The 3D point group acquisition unit 1102 can generate the three-dimensional point group from a plurality of images (for example, the images 110 and 120) acquired at Step S10 and stored in the image storage unit 1101. That is, the 3D point group acquisition unit 1102 generates the three-dimensional point group (a three-dimensional model) from a plurality of two-dimensional images.

The 3D point group acquisition unit 1102 extracts respective features from the image 110 and the image 120 stored in the image storage unit 1101, for example. The 3D point group acquisition unit 1102 compares the features of the image 110 with the features of the image 120 and identifies the features that match between the images 110 and 120. The 3D point group acquisition unit 1102 determines, regarding the features that match in each pair, each three-dimensional point using triangulation by a stereo method, for example. This is not a limitation and the 3D point group acquisition unit 1102 may acquire the three-dimensional point group using a three-dimensional measurement device.

At the next Step S12, the 3D mesh generator 1103 generates the three-dimensional mesh 150 that approximates a part of the three-dimensional point group generated at Step S11. The 3D mesh generator 1103 can determine, with respect to a certain three-dimensional shape model or a user-specified three-dimensional shape model, parameters by random sample consensus (RANSAC) algorithm, for example.

The 3D mesh generator 1103 can generate the three-dimensional mesh 150 of a developable surface. In this case, the distortion of a two-dimensional development view generated in the processing at a later-described Step S13 can be suppressed. The 3D mesh generator 1103 can further generate the three-dimensional mesh 150 of a plane surface. In this case, in the processing at a later-described Step S14, the transformation between a captured image and a two-dimensional development view can be described by a single homography matrix.

Moreover, the 3D mesh generator 1103 can generate the three-dimensional mesh 150 of a circular cylindrical surface, a quadric surface, or a spherical surface. In these cases, in the later-described processing at Step S13, the transformation between a captured image and a two-dimensional development view can be described by a unique transformation equation. The 3D mesh generator 1103 can further generate the three-dimensional mesh 150 of a free-form surface. In this case, at the later-described processing at Step S13, the three-dimensional point group can be approximated at any level.

At the next Step S13, the 2D development view generator 1104 generates the two-dimensional development view 130 of the three-dimensional mesh 150 generated at Step S12. The 2D development view generator 1104 transforms the respective subplanes of the three-dimensional mesh 150 into the two-dimensional development view 130 while the shapes and relative areas thereof are kept retained. Accordingly, this can suppress the distortion in deploying a three-dimensional mesh into two-dimensional coordinates.

At the next Step S14, the transformation coefficient generator 1105 generates a transformation coefficient of the two-dimensional development view 130 and images (for example, the images 110 and 120). The transformation coefficient generator 1105 can describe the transformation coefficient using a homography matrix. This is not a limitation and the transformation coefficient generator 1105 may define the transformation coefficient as the transformation from a cylindrical development view to images. In this case, the transformation between captured images and a two-dimensional development view can be described by a unique transformation equation.

At the next Step S15, the deformation unit 1106 deforms, based on the transformation coefficient generated at Step S14, an image (for example, the image 110) that is based on a captured image into the two-dimensional development view 130, and generates a deformed image (for example, the image 131). The deformation unit 1106 in the first embodiment can combine a plurality of deformed images (for example, the images 131 and 132) to generate the panoramic image 140 (two-dimensional panoramic image). In this case, by the panoramic image 140, a later-described annotation can be looked down at. This is not a limitation, however, and the deformation unit 1106 can retain a plurality of deformed images as respective layers. By retaining the deformed images as layers, the combination process of the panoramic image can be omitted.

At the next Step S16, the annotation superimposing unit 1107 transforms, based on the transformation coefficient generated at Step S15, an input of coordinate values of image coordinates of one (a third image) of the image, which is based on a captured image (for example, the images 110 and 120), and the two-dimensional development view 130 into image coordinate values of the other. The annotation superimposing unit 1107 performs the input of coordinate values using an input value of a device such as the pointing device 1017. This is not a limitation and for example, when the image processing apparatus 1000 is for performing inspection support of a bridge and a building structure, the annotation superimposing unit 1107 may perform the input of coordinate values using values of image processing result obtained by executing a computer program such as a damage detection algorithm.

Next, with reference to FIGS. 8 and 9, display examples of images and annotations in the first embodiment will be described. In FIGS. 8 and 9, the portions that are common to the above-described FIGS. 1A to 1D are denoted by the identical reference signs and the detailed descriptions thereof are omitted.

FIGS. 8A and 8B illustrate a display example of an annotation that is determined based on the image (for example, the image 110) acquired at Step S10, at least one of the two-dimensional development view 130 and the panoramic image 140 generated at Step S15, and the coordinate values transformed corresponding to the foregoing images at Step S16.

FIG. 8A illustrates an example of the two-dimensional development view 130 or the panoramic image 140 generated at Step S15. FIG. 8B illustrates, with reference to FIG. 1B, the image 120 corresponding to the image 132 that is included in the two-dimensional development view 130 or the panoramic image 140 illustrated in FIG. 8A, and the text 122 that is the annotation superimposed on the image 120 in accordance with the coordinate value 121. The image processing apparatus 1000 in the first embodiment arranges, in a window 400, the image 120 and the annotation superimposed on the image 120 in accordance with the coordinate value 121, and makes the display 1014 display the image 120 and the annotation.

Furthermore, in the window 400, the image (for example, the image 110) acquired at Step S10 is displayed, and based on the arrangement of the corresponding image (for example, the image 131) generated at Step S15 in the two-dimensional development view 130, an image (for example, the image 120) subsequently displayed can be selected. As just described, the image processing apparatus 1000 in the first embodiment can determine, based on the spatial arrangement of a plurality of two-dimensional images, the image displayed in the window 400. Accordingly, the images (for example, the images 131 and 132) based on a plurality of captured images can be displayed in sequence.

At this time, the image processing apparatus 1000 can determine the image displayed on the basis of order of imaged time of the respective images. This is not a limitation and the image processing apparatus 1000 can determine the image displayed based on the position of user input to the panoramic coordinates (the panoramic image 140).

FIG. 9 illustrates an example of a window 410 that displays at least the two-dimensional development view 130 or the panoramic image 140 generated at Step S15. In the example in FIG. 9, in the window 410, the two-dimensional development view 130 or the panoramic image 140 that includes the images 131 and 132 generated at Step S15 is displayed. The image processing apparatus 1000 can select which of the images 131 and 132 to be displayed, depending on the coordinate value input with respect to the two-dimensional development view 130 or the panoramic image 140 displayed in the window 410.

In the example in FIG. 9, the image 132 is selected, and in the left side area in the window 410, the image 120 corresponding to the selected image 132 is displayed. As just described, the image processing apparatus 1000 in the first embodiment can display an image that is optimal for the observation of an attention area.

It is not limited thereto, however, and in the image processing apparatus 1000 in the first embodiment, with respect to the window 410, the image (for example, the image 131) generated at Step S15 is displayed, and based on a coordinate value input for the displayed image 131, an image that allows the periphery of the coordinate value to be observed in the highest resolution can be selected as the image displayed, for example. That is, the image processing apparatus 1000 can, based on the coordinate values input to the panoramic coordinates and on the resolution of the periphery of the input coordinate values of a plurality of two-dimensional images (for example, the images 131 and 132) that are projected onto the panoramic coordinates, determine the image displayed.

Moreover, in the image processing apparatus 1000 in the first embodiment, the image (for example, the image 131) generated at Step S15 is displayed in the window 410, and based on the transformation coefficient generated at Step S14, the coordinate value input for the displayed image 131 is transformed into the coordinate values of the image (for example, the image 110) corresponding to the image 131 acquired at Step S10. Accordingly, the image processing apparatus 1000 can select, as an image displayed, the image that allows the periphery of the transformed coordinate values to be observed at the highest resolution. That is, the image processing apparatus 1000 can, based on the position of the coordinate values input to the panoramic coordinates that corresponds to the projection onto the panoramic coordinates of a plurality of two-dimensional images (for example, the images 131 and 132) and on the resolution of the peripheries of the input coordinate values of those two-dimensional images, determine the image displayed.

As in the foregoing, in the image processing apparatus 1000 in the first embodiment, a panoramic image is generated based on a three-dimensional model generated from a plurality of images in which the observation object is imaged. Then, the image processing apparatus 1000 in the first embodiment specifies the coordinate value and contents on any of the images, and at the position corresponding to the specified coordinate value on the panoramic image that includes those images, and makes it possible to display the contents associated with the coordinate value. Thus, the perspicuity of the information associated with the specified position on the three-dimensional model is improved.

The image processing apparatus 1000 in the first embodiment can move the three-dimensional mesh 150 generated at Step S12 in a certain direction according to the user input to fine-tune the position of the three-dimensional mesh 150. The image processing apparatus 1000 can determine the certain direction based on the weighted sum of normal vectors of the respective sub-planes of the three-dimensional mesh 150. FIGS. 10A and 10B are views for explaining the adjustment of the position of a three-dimensional mesh in the first embodiment. In FIGS. 10A and 10B, the portions that are common to the above-described FIG. 2 are denoted by the identical reference signs and the detailed descriptions thereof are omitted. FIG. 10A conceptually illustrates an example where a three-dimensional mesh $150_0$ is moved by the position adjustment from the observation point $P_1$ or $P_2$ toward the back side (three-dimensional mesh $150_2$) and toward the near side (three-dimensional mesh $150_1$). FIG. 10B is a view of the object 100 and the observation point $P_1$ or $P_2$ in FIG. 10A from the above.

FIGS. 11A and 11B are views for explaining the processing of transforming the three-dimensional mesh 150 into the two-dimensional development view 130 performed by the above-described Step S13 in the first embodiment. FIGS. 11A and 11B illustrate the transformation between the three-dimensional mesh 150 and the image 110 that is a two-dimensional image. In FIG. 11A, the mathematical expression "K[R|t]X" indicated therein is an expression for transforming a three-dimensional point into a coordinate x of a camera image. In the mathematical expression "K[R|t]X", a value X indicates three-dimensional coordinates (hereinafter referred to as three-dimensional point X as appropriate) of a point on a three-dimensional mesh. Furthermore, a value K is a camera parameter, a value R represents the attitude (rotation) with respect to a three-dimensional model of the camera, and the value t represents the translation of the camera and the three-dimensional model. The three-dimensional mesh 150 is assumed to be in any desired shape.

By using FIG. 11B and the following Expression 1, Expression 2, and Expression 3, a method of obtaining an unknown three-dimensional point X from the coordinate x of the camera image will be described. FIG. 11B and the following Expression 1, Expression 2, and Expression 3 indicate an example of the transformation of coordinates of a point 601 on the three-dimensional mesh 150 of the image 110 into a part of a developable cylinder that can be described by variables r, θ, and h. Expression 4 indicates the relation of the respective variables used in Expression 1 to Expression 3. In Expression 1 to Expression 4, a variable $t_m$, indicates the position of the three-dimensional model, and variables $x_m$, $y_m$, and $z_m$ indicate three respective axes that represent the attitude of the three-dimensional model. In Expression 1 to Expression 4, a value X-bar (indicated by a bar added on top of the letter "X") indicates the direction at the three-dimensional point X.

From the geometrical relation between the image 110 and the point 601 on the three-dimensional mesh 150 in FIG. 11B, Expression 1 to obtain a variable r can be established. Based on Expression 1, Expression 2 and Expression 3 for obtaining the desired variables h and θ can be derived.

The more specific description will be made. When the mathematical expression "K[R|t]X" in FIG. 11A is inversely solved, the three-dimensional point X itself is not obtained but, as indicated by the mathematical expression "X-bar=K⁻¹x" in FIG. 11B, the direction of the three-dimensional point X is obtained. Because the three-dimensional point X is the point that is on the vector indicated by the value X-bar, as indicated in the expression on the right-hand side of Expression 1, the three-dimensional point X can be obtained by multiplying the value X-bar by a coefficient s.

As indicated in the expression on the left-hand side in Expression 1, and in Expression 2 and Expression 3, it is necessary to obtain the three-dimensional point X and the coefficient s in order to obtain the variables r, h, and θ. The coefficient s can be obtained based on the value X-bar, variable $t_m$, and the variables $x_m$, $y_m$, and $z_m$, that represent the position and attitude of the three-dimensional model, as indicated in Expression 4.

$$\|X - t_m - ((X - t_m)^T z_m) z_m\| = r, \; X = s\overline{X} \quad (1)$$

$$h = sb - d \quad (2)$$

$$\theta = \cos^{-1}\left(\frac{(s\overline{X} - h z_m)^T x_m}{\|s\overline{X} - h z_m\|}\right) \quad (3)$$

$$\begin{cases} s = \dfrac{-\beta + \sqrt{\beta^2 - \alpha\gamma}}{\alpha} \\ \alpha = a - b^2 \\ \beta = bd - c \\ \gamma = e - d^2 - r^2 \\ a = \overline{X}^T \overline{X} \\ b = \overline{X}^T z_m \\ c = \overline{X}^T t_m \\ d = t_m^T z_m \\ e = t_m^T t_m \end{cases} \quad (4)$$

Second Embodiment

Next, a second embodiment will be described. The second embodiment provides a user interface (UI) for performing browsing the images obtained by the image processing apparatus 1000 in the above-described first embodiment.

FIG. 12 is a functional block diagram for explaining one example of functions of an image processing apparatus 1001 according to the second embodiment. In FIG. 12, the portions that are common to the above-described FIGS. 6A and 6B are denoted by the identical reference signs and the detailed descriptions thereof are omitted. The image processing apparatus 1001 has a configuration in which a UI unit 1121, a deformed-image storage unit 1122, an image-information storage unit 1123, and a drawing storage unit 1124 have been added to the image processing apparatus 1000 in FIGS. 6A and 6B. The function of the specifying unit 1108 illustrated in FIGS. 6A and 6B is included in the function of the UI unit 1121.

As for the image processing apparatus 1001 in the second embodiment, as a hardware configuration, the hardware configuration of the image processing apparatus 1000 in the first embodiment described with reference to FIG. 5 can be applied as is.

The UI unit 1121 is configured by a display program that operates on the CPU 1010. This is not a limitation and the UI unit 1121 may be configured by a hardware circuit. Each of the deformed-image storage unit 1122, the image-information storage unit 1123, and the drawing storage unit 1124 is configured by a certain storage area in the storage 1015 or the RAM 1012.

In the deformed-image storage unit 1122, a deformed image deformed based on the transformation coefficient by the deformation unit 1106 and to which identification information that identifies the deformed image is added is stored. At this time, the deformation unit 1106 associates the identification information of the deformed image with the identification information of the image by a captured image to be a source of the deformed image. In the following description, unless otherwise noted specifically, an "image by a captured image" is described as a "captured image".

In the drawing storage unit 1124, a drawing of the object 100 to which the panoramic image 140 corresponds is stored, for example. The image processing apparatus 1001 is made to read a file in which the drawing data at the time of designing the object 100 is stored, for example, to store the drawing into the drawing storage unit 1124. This is not a limitation and the drawing storage unit 1124 may be made to store therein the drawing data that is automatically generated based on the captured image of the object 100, for example.

The UI unit 1121 generates display control information for making the display 1014 display a user interface screen, for example. For example, the graphics I/F 1013 illustrated in FIG. 5 makes the display 1014 display the user interface screen in accordance with this display control information. Furthermore, the UI unit 1121 receives, depending on the user interface screen, user operation that is carried out using an input device such as the pointing device 1017 and the keyboard 1018, for example.

The UI unit 1121 receives the two-dimensional development view 130 or the panoramic image 140 that are output from the annotation superimposing unit 1107. In the following description, unless otherwise noted specifically, the panoramic image 140 is described as the representative of the two-dimensional development view 130 and the panoramic image 140. The UI unit 1121 further receives a deformed image stored in the deformed-image storage unit 1122. The UI unit 1121 can generate a deformed image, and an image in which the deformed image is superimposed on the panoramic image 140 corresponding to the deformed image. Moreover, the UI unit 1121 can create a trihedral view and a cubic diagram based on the drawing data stored in the drawing storage unit 1124.

The UI unit 1121 can perform image processing such as expansion and reduction, according to the user operation, on the received panoramic image 140 and the captured image. The UI unit 1121 can further perform, according to the user operation, the processing of selecting a single captured image out of a plurality of captured images corresponding to the panoramic image 140, and the processing of selecting and displaying in sequence the captured images in a certain order, for example.

As just described, the UI unit 1121 can be considered as a display device that is connected to the image processing apparatus 1000 illustrated in FIG. 5, for example.

The image-information storage unit 1123 stores therein, associating with one another, information on a captured image stored in the image storage unit 1101, information on a deformed image stored in the deformed-image storage unit 1122, and information on the panoramic image 140. The image-information storage unit 1123 further stores therein the history, in association with the information on a captured image, of processing performed on the captured image by the UI unit 1121 according to the user operation.

Table 1 illustrates an example of the information stored in the image-information storage unit 1123. The information the image-information storage unit 1123 stores therein includes the information concerning a captured image, the information concerning a deformed image for which the captured image is deformed by the deformation unit 1106, and the information concerning a panoramic image that includes the deformed image, for example.

TABLE 1

| Captured image | Identification information of captured image |
| --- | --- |
| | Imaged time |
| | Resolution (size) |
| | Imaging distance |
| | Quality evaluation value |
| | Operation history |
| Deformed image | Identification information of deformed image |
| | Browsing flag |
| | Position on panoramic image |
| Panoramic image | Identification information of panoramic image |

The information concerning a captured image includes identification information of the captured image, imaged time, resolution (size), an imaging distance, and a quality evaluation value, for example. The identification information of the captured image is the information that can identify each of a plurality of captured images that correspond to a single panoramic image 140. The imaged time is the time (date and time) the captured image is imaged. The resolution (size) is the respective numbers of pixels of the captured image in the horizontal and vertical directions, for example. The imaging distance is a distance from the camera to the subject. The quality evaluation value is a value to evaluate the quality of a captured image, and a value of a blurred degree, contrast, and others of the captured image can be used. The operation history is the information, which is stored in sequence and accumulated, on the processing performed on the captured image by the UI unit 1121 in accordance with the user operation.

Of the foregoing pieces of information, the identification information of a captured image, the imaged time, the resolution (size), and the imaging distance can be acquired from the camera or the control circuit of the camera. The quality evaluation value is calculated by the UI unit 1121 based on the captured image, for example.

As for the information on a captured image, further included can be an imaging position (camera position) and an imaging direction at the time of imaging the captured image. These imaging position and imaging direction can be detected by providing, on the camera, a nine-axis sensor including a gyro sensor (an angular velocity sensor), which performs detection at three respective axes of x, y, and z, an acceleration sensor, and a geomagnetic sensor, and using the output of the nine-axis sensor, for example. Moreover, as the information on the captured image, the information indicative of an angle of view of the camera may be included. For example, using the imaging position, the imaging direction, the angle of view, and the above-described imaging distance, a spatial location of the captured image can be obtained.

The information concerning the deformed image includes identification information of the deformed image, a browsing flag, an operation history, and the position on the panoramic image, for example. The identification information of the deformed image is the information to identify each of a plurality of deformed images belonging to a single panoramic image 140. The browsing flag is a flag that indicates whether the deformed image has been selected in accordance with an instruction of the UI unit 1121.

As for the position on the panoramic image, the position of the deformed image on the panoramic image to which the deformed image belongs can be used. Associating the deformed image with the position on the panoramic image is executable in the course of the processing of generating three-dimensional point group from a plurality of two-dimensional images at Step S11 in the flowchart in FIG. 7 and the processing of combining a plurality of deformed images to generate the panoramic image 140 at Step S15, for example.

The identification information of the panoramic image is the identification information that identifies the panoramic image to which the captured image (deformed image) corresponds, and the information that can uniquely identify the panoramic image is used.

UI in Second Embodiment

Next, the UI in the second embodiment will be described more specifically. In the following description, it is described that the image processing apparatus 1001 in the second embodiment displays the panoramic image 140 based on the captured images used for inspecting a building structure such as a bridge.

First Example of UI in Second Embodiment

FIG. 13 illustrates a first example of a UI screen presented by the UI unit 1121 in the second embodiment. The UI screen in the first example is a screen suitable for use in performing inspection work using a panoramic image, for example.

In FIG. 13, a UI screen 200a includes a tool bar 201, a panoramic-image display area (panorama view) 210, an inspection-image display area (photo view) 220, a panorama selection area (select panorama) 230a, and an operation-specifying area 240. The tool bar 201 includes a file-specifying portion that specifies a file to be stored in the storage 1015 of the image processing apparatus 1001.

The panoramic-image display area 210 displays the panoramic image 140 selected as a browsing object. The inspection-image display area 220 displays, as an inspection image 2100a of an inspection object, a captured image corresponding to the position specified with respect to the panoramic image 140 displayed in the panoramic-image display area 210. The panorama selection area 230a displays a list of selectable panoramic images based on a file specified in the file-specifying portion.

The operation specifying area 240 includes operator elements and input areas for specifying the operation in the UI screen 200a. In the example in FIG. 13, the operation specifying area 240 includes a mode selection area 2401, an option selection area 2402, a slide-show control area 2403, a tool selection area 2404, and a save and exit instruction area 2405.

The mode selection area 2401 is an area for selecting a mode of the UI screen 200a. The UI screen 200a provides three modes of an "inspection mode", a "drawing positioning mode", and an "imaged-quality check mode", for example. The "inspection mode" is a mode for performing the inspection of an observation object based on the panoramic image 140 and the inspection image 2100a. The "drawing positioning mode" is a mode for performing a positioning operation of the panoramic image 140 with respect to a drawing based on the drawing data stored in the drawing storage unit 1124, for example. The "imaged-quality check mode" is a mode for checking the imaged quality of each captured image corresponding to the panoramic image 140. In the example in FIG. 13, out of the three modes, the "inspection mode" is being selected.

The option selection area 2402 is an area for selecting a display method of captured image displayed corresponding to the panoramic image 140 in the panoramic-image display area 210. In this example, two display methods of "source-image inset combination" and "inspection status check" are selectable depending on the input for check boxes. The specific examples of these two display methods will be described later.

The slide-show control area 2403 includes the operator elements that perform the control of displaying in sequence the inspection image 2100a that is displayed in the inspection-image display area 220 among a plurality of inspection images 2100a corresponding to the panoramic image 140 that is displayed in the panoramic-image display area 210 in a certain order.

The tool selection area 2404 is an area for selecting a tool usable in the panoramic-image display area 210 and the inspection-image display area 220. The tools displayed in the tool selection area 2404 differ depending on the mode selected in the mode selection area 2401. In the example in FIG. 13 in which the "inspection mode" is selected in the mode selection area 2401, the tool selection area 2404 displays selectable tools for performing any desired drawing and character inputting in the panoramic-image display area 210 and the inspection-image display area 220.

The save and exit instruction area 2405 includes a save button 2405a and an exit button 2405b. The save button 2405a is a button to save pieces of information concerning the panoramic image 140 that is a browsing object in the UI screen 200a. For example, the save button 2405a saves, in response to the operation, an inspection result based on the respective captured images and intermediate data for which a temporary interruption of the inspection work is assumed.

As a more specific example, the UI unit 1121 stores into the storage 1015, in response to the operation made to the save button 2405a, in association with one another, the panoramic image 140 (or the two-dimensional development view 130) on display in the panoramic-image display area 210; the respective captured images and the respective deformed images corresponding to the panoramic image 140; the information on the panoramic image 140, the respective captured images, and the respective deformed images; the information on the annotations (for example, the coordinate value 133 of an object that indicates the annotation, and the text 134); and the histories of processing that has been performed on the respective captured images. The UI unit 1121 can further save, in response to the operation made to the save button 2405a, a captured image in which the annotation is superimposed within the image. Furthermore, the UI unit 1121 can also save, in response to the operation made to the save button 2405a, the panoramic image 140 or the two-dimensional development view 130 in which the annotation is superimposed within the image, as an inspection result image. The exit button 2405b is a button to close the UI screen 200a.

The panoramic-image display area 210 will be described more specifically. The UI unit 1121 is used to display, in the panoramic-image display area 210, the panoramic image 140 that is stored in a file specified through the file-specifying portion included in the tool bar 201 according to the user operation, for example.

The UI unit 1121 can, according to the user operation, perform expansion and reduction of the panoramic image 140 displayed in the panoramic-image display area 210. The UI unit 1121 performs the expansion and reduction of the panoramic image 140 using the interpolation and thinning in units of pixels, for example.

As an example of an instruction method of expansion and reduction, it is conceivable that the UI unit 1121 assigns the expansion function and the reduction function of the panoramic image 140 to certain keys (for example, expansion to "+" key and reduction to "−" key) of the keyboard 1018 and performs the expansion and reduction of the panoramic image 140 in response to the operation to these keys. The instruction of expansion and reduction is not limited to this example. For example, respective buttons for instructing the expansion and reduction of the panoramic image 140 may be arranged in the panoramic-image display area 210, to perform the expansion and reduction of the panoramic image 140 according to the user operations to the respective buttons. Furthermore, it is also conceivable that the expansion and reduction are performed in response to the operation of the wheel of the mouse as the pointing device 1017, for example.

According to the UI unit 1121, by specifying the position on the panoramic image 140 by the user operation, the captured image corresponding to the position can be selected as an inspection image that is an image of the inspection object. In the example in FIG. 13, a situation in which, in the panoramic-image display area 210, a frame of a deformed image 2100 that corresponds to the specified position is being displayed and the captured image identified by the identification information "no. 15" that corresponds to the deformed image 2100 is being specified, is illustrated. In the example in FIG. 13, in the option selection area 2402, the "source image inset combination" is being selected, and the captured image identified by the identification information "no. 15" is displayed in inset combination at the specified position (position corresponding to the deformed image 2100) of the panoramic image 140.

The inspection-image display area 220 will be described more specifically. The UI unit 1121 displays in the inspection-image display area 220 the captured image specified in the panoramic-image display area 210 as the inspection image 2100a. For example, the UI unit 1121 refers to the information stored in the image-information storage unit 1123, identifies a deformed image corresponding to the specified position of the panoramic image 140, and further identifies the information on the captured image corresponding to the specified deformed image. The UI unit 1121 acquires the captured image indicated in the information on the identified captured image from the image storage unit 1101, and displays the acquired captured image in the inspection-image display area 220 as the inspection image 2100a.

The UI unit 1121 can, according to the user operation, perform expansion and reduction of the inspection image 2100a displayed in the inspection-image display area 220. The UI unit 1121 performs the expansion and reduction of the inspection image 2100a using the interpolation and thinning in units of pixels, for example. In the expansion and reduction of the inspection image 2100a in the inspection-image display area 220, the above-described instruction method of expansion and reduction of the panoramic image 140 in the panoramic-image display area 210 and the method of expansion and reduction can be applied.

The inspection-image display area 220 includes a button 2200$_U$ for instructing upward movement, a button 2200$_D$ for instructing downward movement, a button 2200$_L$ for instructing leftward movement, and a button 2200$_R$ for instructing rightward movement. The UI unit 1121 can, based on the respective spatial locations of a plurality of captured images, switch the captured image, which is displayed in the inspection-image display area 220 as the inspection image 2100a, to a captured image of the upper, lower, left, and right sides of the relevant captured image, according to the user operation to these buttons 2200$_U$, 2200$_D$, 2200$_L$, and 2200$_R$.

As one example, the UI unit 1121 refers to the information stored in the image-information storage unit 1123, and on the deformed images that belong to the panoramic image 140 displayed in the panoramic-image display area 210, acquires the positions on the panoramic image 140. The UI unit 1121 acquires, with respect to a deformed image corresponding to the inspection image 2100a, the identification information of the deformed images that are positioned over, under, left of, and right of the panoramic image 140 based on the positions of the acquired deformed images on the panoramic image 140. The UI unit 1121 acquires the identification information of a captured image corresponding to the identification information of the deformed image located over, under, left of, or right of the deformed image corresponding to the inspection image 2100a, and acquires the captured image indicated in the acquired identification information of the captured image from the image storage unit 1101, according to the user operation to the buttons $2200_U$, $2200_D$, $2200_L$, and $2200_R$. The UI unit 1121 displays in the inspection-image display area 220 the captured image thus acquired, as the inspection image 2100a according to the user operation to the buttons $2200_U$, $2200_D$, $2200_L$, and $2200_R$.

The UI unit 1121 can display the captured images corresponding to the panoramic image 140 in the inspection-image display area 220 as the inspection image 2100a such that the displayed captured images are switched in sequence in a certain order. For example, the UI unit 1121 can refer to the information stored in the image-information storage unit 1123, select the captured images stored in the image storage unit 1101 in order of imaged time according to the user operation to the slide-show control area 2403, and display the captured images in sequence in the inspection-image display area 220 as the inspection image 2100a. The UI unit 1121 can display, according to the user operation to the slide-show control area 2403, the captured images in sequence based on the imaged time in the chronological order (forward feeding) or in the reverse direction of the chronological order (backward feeding). The UI unit 1121 can also perform, according to the user operation to the slide-show control area 2403, a change in display speed of the captured images, and a temporary halt of the sequential display.

The UI unit 1121 can receive the input of annotation to be displayed for the inspection image 2100a displayed in the inspection-image display area 220. For example, the UI unit 1121 can be made to receive, in the inspection-image display area 220, the input of annotation for the position specified by a cursor 250.

For example, the UI unit 1121 delivers to the annotation superimposing unit 1107 the information indicative of the received annotation and position, and the identification information of the captured image corresponding to the inspection image 2100a on display. The annotation superimposing unit 1107 superimposes, based on the delivered information indicative of the annotation and position and the identification information of the captured image, the annotation to the specified position on the captured image, and delivers to the UI unit 1121 the captured image on which the annotation has been superimposed. The UI unit 1121 updates, by the captured image on which the annotation has been superimposed, the inspection image 2100a displayed in the inspection-image display area 220.

The panorama selection area 230 will be described more specifically. The panorama selection area 230 is an area for selecting a single panoramic image 140, when a plurality of panoramic images 140 are generated for a single observation object, to be displayed in the panoramic-image display area 210 out of the panoramic images 140. In the example in FIG. 13, the UI unit 1121 generates thumbnail images 2300a, 2300b, and 2300c of the respective panoramic images 140 generated for three surfaces of a single observation object, and is displaying the respective thumbnail images 2300a, 2300b, and 2300c in the panorama selection area 230. The UI unit 1121 displays in the panoramic-image display area 210, out of the thumbnail images 2300a, 2300b, and 2300c, the panoramic image 140 corresponding to the thumbnail selected according to the user operation.

As in the foregoing, in the UI screen 200a according to the "inspection mode", by specifying a desired position in the panoramic image 140 displayed in the panoramic-image display area 210, a captured image corresponding to the specified position is displayed in the inspection-image display area 220 as the inspection image 2100a. Furthermore, in the inspection-image display area 220, according to the user operation, the processing of expansion and reduction of the displayed inspection image 2100a, switching over to other adjacent captured images, and others are available. Accordingly, the user (observer) can perform the observation (inspection) of a part of the observation object more easily.

The UI unit 1121 can store into the image-information storage unit 1123 the user operation performed on the UI screen 200a one after another as the operation history. For example, the UI unit 1121 can store, as the operation history, the operation of expansion and reduction performed in the panoramic-image display area 210. The UI unit 1121 can further store, as the operation history, the identification information of the captured image specified in the panoramic-image display area 210 and displayed in the inspection-image display area 220 as the inspection image 2100a. In the same manner, the UI unit 1121 can store, as the operation history, the operation made to the buttons $2200_U$, $2200_D$, $2200_L$, and $2200_R$ for instructing upward, downward, leftward, and rightward movement, respectively, in the inspection-image display area 220, and the operation of expansion and reduction made to the inspection image 2100a displayed in the inspection-image display area 220. Moreover, the UI unit 1121 can store the identification information of the captured image for which the annotation is input in the inspection-image display area 220.

Second Example of UI in Second Embodiment

FIGS. 14A, 14B, and 14C illustrate a second example of the UI screen in the second embodiment. The UI screen in the second example is a screen for positioning of the panoramic image 140 with respect to a drawing. In FIGS. 14A, 14B, and 14C, the portions that are common to the above-described FIG. 13 are denoted by the identical reference signs and the detailed descriptions thereof are omitted.

In FIG. 14A, in a UI screen 200b, the "drawing positioning mode" is being selected in the mode selection area 2401. In the tool selection area 2404, depending on the "drawing positioning mode" selected in the mode selection area 2401, tools for selecting the number of control points used for the positioning are displayed. In the example in FIG. 14A, in the tool selection area 2404, as the number of control points, any of four points, six points, and eight points is selectable.

The UI unit 1121 displays, in the panoramic-image display area 210, a drawing 2106 by the drawing data that is stored in a file specified by the file-specifying portion included in the tool bar 201 according to the user operation, together with the panoramic image 140, for example.

By selecting a desired number of control points in the tool selection area 2404, the control points of the selected number are set for the drawing 2106 displayed in the panoramic-image display area 210. The UI unit 1121 can set the control points at appropriate positions (for example, corner portions) depending on the shape of the drawing 2106, for example. The control point is a point for which the position and the like are made to be changeable on the screen by the user operation.

In the example in FIG. 14A, the control point of four points is selected in the tool selection area 2404, and at four corner portions of the drawing 2106 displayed in the panoramic-image display area 210, respective control points $2102_1$, $2102_2$, $2102_3$, and $2102_4$ are being set. In the example in FIG. 14A, the respective control points $2102_1$, $2102_2$, $2102_3$, and $2102_4$ are denoted by the numbers of "1" to "4".

The UI unit 1121 specifies, according to the user operation, the positions of the panoramic image 140 corresponding to the respective control points $2102_1$, $2102_2$, $2102_3$, and $2102_4$.

For example, according to the UI unit 1121, using drag-and-drop operation (indicated by an arrow A in FIG. 14A) with the pointing device 1017 depending on the display of the cursor 250 by the user, each of the control points $2102_1$, $2102_2$, $2102_3$, and $2102_4$ can be associated with the respective positions of the panoramic image 140. In the example in FIG. 14A, each of the control points $2102_1$, $2102_2$, $2102_3$, and $2102_4$ is associated with the respective corner portions $2102_1'$, $2102_2'$, $2102_3'$, and $2102_4'$ of the panoramic image 140.

The UI unit 1121 calculates a coordinate transformation coefficient for making each of the positions specified in the panoramic image 140 match the respective positions of the control points $2102_1$, $2102_2$, $2102_3$, and $2102_4$. The UI unit 1121 transforms the coordinates of the panoramic image 140 into the coordinates of the drawing 2106 according to the calculated coordinate transformation coefficient. Consequently, the size and shape of the panoramic image 140 are transformed into the size and shape of the drawing 2106, and the positioning of the panoramic image 140 with respect to the drawing 2106 is performed.

FIG. 14B illustrates an example of a panoramic image 140' obtained by performing the positioning to the drawing 2106, and transforming the size and shape to match the drawing 2106. In the example in FIG. 14B, with respect to the drawing 2106 in the panoramic-image display area 210 in FIG. 14A, the panoramic image 140' for which the coordinates have been transformed is displayed in superposition matching the position, size, and shape.

The UI unit 1121 transforms the coordinates of the respective deformed images also corresponding to the panoramic image 140 according to the calculated coordinate transformation coefficient. Accordingly, the UI unit 1121 can identify the captured image corresponding to the position specified on the coordinate-transformed panoramic image 140'.

In the example in FIG. 14A, in the UI screen 200b, on at least a part of the respective control points $2102_1$, $2102_2$, $2102_3$, and $2102_4$, the distance between points can be input, before or after specifying the corresponding points, in the panoramic-image display area 210. In the example in FIG. 14A, as the actual size values of the width (length) and height of the observation object indicated in the panoramic image 140, a distance $2103_H$ between the control points $2102_1$ and $2102_4$ and a distance $2103_V$ between the control points $2102_4$ and $2102_3$ are being input.

The UI unit 1121 can calculate, based on the pixel width of the panoramic image 140 and each of the input distances $2103_H$ and $2103_V$, the ratio to the actual size (real scale) of the panoramic image 140. The UI unit 1121 can also perform coordinate transformation of the real scale on the panoramic image 140 onto the inspection image 2100a displayed in the inspection-image display area 220, to calculate the real scale on the inspection image 2100a. Accordingly, this makes it possible to estimate the real scale of the width and the like of a crack detected on the inspection image 2100a.

The method of positioning of the panoramic image 140 with respect to the drawing 2106 is not limited to the method using the drawing 2106 described with reference to FIGS. 14A and 14B. The positioning of the panoramic image 140 with respect to the drawing 2106 may be performed, for example, by selecting a graphic (referred to as a reference graphic) of a reference shape, such as a rectangle, a trapezoid, and an octagon, and specifying the positions of the panoramic image 140 corresponding to the control points predetermined for the selected shape.

FIG. 14C illustrates an example of a UI screen 200b' for performing the positioning using the reference graphic. In the UI screen 200b', in the tool selection area 2404, tools for selecting the reference graphic used for positioning are being displayed. In the example in FIG. 14C, in the tool selection area 2404, as the reference graphics for setting the control points, respective graphics of a rectangle, a trapezoid, and an octagon for which opposing two sides are recessed are selectable. It is assumed here that, according to the user operation, the rectangle is selected as the reference graphic. It is assumed that the rectangle is provided in advance with the control points at each of the four vertexes, for example.

The UI unit 1121 specifies, according to the user operation, the positions of the panoramic image 140 corresponding to the control points provided on the reference graphic. In the example in FIG. 14C, as the positions of the panoramic image 140 corresponding to respective control points $2105_1$, $2105_2$, $2105_3$, and $2105_4$ provided on a reference graphic 2104, the four corner portions of the panoramic image 140 are being specified.

The UI unit 1121 calculates, as with the foregoing, a coordinate transformation coefficient for making the position of each point specified in the panoramic image 140 match the respective positions of the control points $2105_1$, $2105_2$, $2105_3$, and $2105_4$. The UI unit 1121 transforms the coordinates of the panoramic image 140 according to the calculated coordinate transformation coefficient. Accordingly, the shape of the panoramic image 140 is transformed into the shape of the selected reference graphic, and the positioning of the panoramic image 140 with respect to the reference graphic 2104 is performed.

In the foregoing, it is more preferable that the UI unit 1121 be configured such that an aspect ratio of the selected reference graphic is changeable according to the user operation, for example.

Also in the method for performing positioning of the panoramic image 140 using the reference graphic, as described with reference to FIGS. 14A and 14B, the distance between points can be input on at least a part of the control points $2105_1$, $2105_2$, $2105_3$, and $2105_4$. The UI unit 1121 can, as with the foregoing, based on the distance between the input points, calculate the real scale on the panoramic image 140 and the real scale on the inspection image 2100a by the captured image corresponding to the specified position with respect to the panoramic image 140.

Third Example of UI in Second Embodiment

FIG. 15 illustrates a third example of the UI screen in the second embodiment. The UI screen in the third example is a screen for checking the imaged quality of captured images used for the panoramic image 140. In FIG. 15, the portions that are common to the above-described FIG. 13 are denoted by the identical reference signs and the detailed descriptions thereof are omitted. In FIG. 15, it is assumed that, in the panoramic-image display area 210, the panoramic image 140' for which the size and shape have been transformed to match the drawing 2106 described with reference to FIGS. 14A and 14B is being displayed.

In FIG. 15, in a UI screen 200c, the "imaged-quality check mode" is being selected in the mode selection area 2401. In the tool selection area 2404, provided are check boxes for selecting the type of target imaged quality depending on the "imaged-quality check mode" selected in the mode selection area 2401. In this example, selectable are, as the image quality, three types of the "imaging resolution" and "imaging distance" that are imaging information, and of the "blurred degree" that is the image-quality evaluation information. The selectable type of imaged quality is not limited to this example. For example, "contrast" and "average brightness" as the image-quality evaluation information may be applied as the type of imaged quality.

For example, in a state in which the panoramic image 140' is displayed in the panoramic-image display area 210, when the "imaged-quality check mode" is selected in the mode selection area 2401, the UI unit 1121 refers to the information stored in the image-information storage unit 1123, and acquires from the image storage unit 1101 the captured images corresponding to the panoramic image 140' displayed in the panoramic-image display area 210. The UI unit 1121, when the type of imaged quality is further selected in the tool selection area 2404, obtains the imaged quality of the selected type on the respective acquired captured images.

For example, when for the respective captured images, respective metadata is acquired and filed in the files in accordance with an exchangeable image file format (Exif), the imaging information such as "imaging resolution" and "imaging distance" can be extracted directly from the files of the respective captured images. Furthermore, the image evaluation information such as a "blurred degree" and "contrast" can be calculated by the UI unit 1121 based on the respective captured images, for example.

These values according to the type of imaged quality can be obtained depending on the user operation in the mode selection area 2401 and the tool selection area 2404. This is not a limitation and the UI unit 1121 may obtain the values according to the type of imaged quality, when the captured images are acquired by the image acquisition unit 1100 and stored into the image storage unit 1101, and store the values into the image-information storage unit 1123 in advance. In this case, the UI unit 1121 acquires the necessary information from the image-information storage unit 1123 depending on the user operation in the mode selection area 2401 and the tool selection area 2404.

The UI unit 1121, as illustrated in FIG. 15, superimposes and displays respective rectangles $2110_1$, $2110_2$, and so on that are indicative of the respective captured images corresponding to the panoramic image 140' at the respective corresponding positions on the panoramic image 140', in the panoramic-image display area 210. At this time, the UI unit 1121 classifies, based on the values acquired on the respective captured images and indicative of the selected imaged quality, the rectangles $2110_1$, $2110_2$, and so on and displays the rectangles in the panoramic-image display area 210.

In the example in FIG. 15, the UI unit 1121 performs threshold determination on the values indicative of the imaged quality of the respective captured images, and classifies the imaged quality of each captured image into three levels: "good", "medium", and "bad". The threshold determination is not limited to the classification of three levels, and may be the classification of two levels or may be the classification of four or more levels. The UI unit 1121 can also be configured such that the values and the number of the thresholds are changeable according to the user operation.

The UI unit 1121 displays the rectangles $2110_1$, $2110_2$, and so on that correspond to the respective captured images, to be color-coded in accordance with the classification result. In FIG. 15, each of the rectangles corresponding to the respective captured images included in an area A for which the imaged quality is "good" is color-coded in a bright color (for example, yellow), each of the rectangles included in an area C for which the imaged quality is "bad" is color-coded in a dark color (for example, brown), and each of the rectangles included in an area B for which the imaged quality is "medium" is color-coded in a somewhat bright color (for example, orange). This color coding is merely one example, and the color coding may be performed using other colors or the classification result may be represented in a method other than the color coding such as contour lines, for example. The classification result of the imaged quality may be represented by the contour lines and color coding in combination.

In FIG. 15, the area for which the rectangles corresponding to the captured images are not superimposed (for example, area D) with respect to the panoramic image 140' indicates the area where imaging is omitted.

Fourth Example of UI in Second Embodiment

FIG. 16 illustrates a fourth example of the UI screen in the second embodiment. The UI screen in the fourth example is a screen for checking a browsing status of the panoramic image 140. In FIG. 16, the portions that are common to the above-described FIG. 13 are denoted by the identical reference signs and the detailed descriptions thereof are omitted. In FIG. 16, it is assumed that, in the panoramic-image display area 210, the panoramic image 140' for which the size and shape have been transformed to match the drawing 2106 described with reference to FIGS. 14A and 14B is being displayed.

In FIG. 16, in a UI screen 200d, the "inspection mode" is being selected in the mode selection area 2401 and the "inspection status check" is being selected in the option selection area 2402. In the tool selection area 2404, tools for selecting the type of information displayed corresponding to the panoramic image 140' in the panoramic-image display area 210 are displayed according to the "drawing positioning mode" selected in the mode selection area 2401 and the "inspection status check" selected in the option selection area 2402. In this example, as the type of information, three types of "displayed", "displayed in expansion", and "written" are selectable.

The UI unit 1121 displays, out of the captured images corresponding to the panoramic image 140', the captured image, which is displayed as the inspection image 2100a in the inspection-image display area 220, explicitly in the panoramic-image display area 210, when the "displayed" is selected by the user operation in the tool selection area 2404.

In the example in FIG. 16, the "displayed" is being selected in the tool selection area 2404. In this case, the UI unit 1121 acquires, based on the operation history or the browsing flag stored in the image-information storage unit 1123, the identification information of the captured image already displayed as the inspection image 2100a in the inspection-image display area 220, out of the respective captured images corresponding to the panoramic image 140', for example.

In the example in FIG. 16, the UI unit 1121 displays, in solid lines, the frames of the deformed images (the respective deformed images included in the range E in FIG. 16) corresponding to the captured images acquired as having been displayed already as the inspection image 2100a, out of the deformed images $2121_1$, $2121_2$, $2121_3$, and so on that correspond to the panoramic image 140' displayed in the panoramic-image display area 210. Meanwhile, the UI unit 1121 displays, in broken lines, the frames of the deformed images (the respective deformed images included in the range F in FIG. 16) corresponding to the captured images that are not acquired as having been displayed already as the inspection image 2100a, out of the respective deformed images $2121_1$, $2121_2$, $2121_3$, and so on.

Accordingly, it is possible to easily distinguish whether the respective captured images corresponding to the panoramic image 140' have been displayed as the inspection image 2100a. Even when the "displayed in expansion" or the "written" is selected in the tool selection area 2404, it is possible to obtain the same effect. When the "written" is selected in the tool selection area 2404, the deformed image corresponding to the captured image to which the annotation is input is displayed explicitly, and the efficiency of the checking of the input annotation can be enhanced.

Fifth Example of UI in Second Embodiment

FIG. 17 illustrates a fifth example of the UI screen in the second embodiment. In the panorama selection area 230a of the UI screen 200a illustrated in FIG. 13, the panoramic images of different surfaces of a single observation object have been displayed using the respective two-dimensional images. Meanwhile, the panorama selection area 230b of the UI screen 200a' by the fifth example displays the panoramic images of different surfaces of a single observation object using a three-dimensional image in which the panoramic images of the respective surfaces are integrated. In FIG. 17, the portions that are common to the above-described FIG. 13 are denoted by the identical reference signs and the detailed descriptions thereof are omitted.

As illustrated in FIG. 17, the UI unit 1121 integrates the thumbnail images 2300a, 2300b, and 2300c of the panoramic image 140 in the panorama selection area 230a in FIG. 13 in accordance with the spatial positional relation, for example, to generate a thumbnail image 2301 of three-dimensional image. The UI unit 1121 displays the generated thumbnail image 2301 in the panorama selection area 230b of the UI screen 200a'. The UI unit 1121 can rotate the thumbnail image 2301 in the three-dimensional space according to the user operation made for a rotation instruction icon 2302 displayed in the panorama selection area 230b. The UI unit 1121, according to the user operation made on a single surface of the thumbnail image 2301, displays in the panoramic-image display area 210 the panoramic image 140 corresponding to the surface.

As just described, the use of the thumbnail image 2301 by three-dimensional image makes it possible to select the panoramic image 140 displayed in the panoramic-image display area 210 more intuitively.

In the first UI screen 200a, the second UI screens 200b and 200b', the third UI screen 200c, the fourth UI screen 200d, and the fifth UI screen 200a' in the foregoing, the type of the input device to carry out the user operation is not particularly limited as long as it is possible to specify a position on the screen. For example, as the input device, a mouse, a keyboard, a pen tablet, a joystick, a track ball, a touch panel, and others can be applied. Furthermore, an imaging apparatus may be built in or connected to the image processing apparatus 1001, to perform the user operation can also be performed using the bodily motion of the user such as gesture, head tracking, and gaze. Moreover, a sound collecting device such as a microphone may be built in or connected to the image processing apparatus 1001, to carry out the user operation using voice.

For example, when a pen tablet is used as an input device, annotation input can be performed intuitively. Furthermore, when a touch panel is used as an input device, intuitive browsing, such as sending the inspection image 2100a by a swipe operation and giving instructions of the expansion and reduction by a pinching operation with two fingers, is possible.

Moreover, it is also conceivable to employ a head-mounted display (HMD) as the display 1014. By providing, on the HMD, a detection unit (for example, a nine-axis sensor) that detects the attitude, it becomes possible to give instructions of the expansion and reduction and the like by head tracking. By providing, on the HMD, a gaze detection unit (for example, a camera), it is possible to give instructions of the viewpoint movement and the expansion and reduction based on the gaze. As just described, by employing, as the display 1014, the HMD on which the attitude detection unit and the gaze detection unit are provided, comprehending the total image of the observation object and browsing in detail can be carried out intuitively.

Third Embodiment

Next, a third embodiment will be described. The third embodiment provides an imaging apparatus applicable in common to the above-described first embodiment and second embodiment. In the third embodiment, a camera is mounted on a remotely operable flying object to configure the imaging apparatus. Using the imaging apparatus provided in the third embodiment, and the above-described image processing apparatus 1000 or 1001, it is possible to configure an inspection system that is capable of performing the inspection of an observation object more easily.

FIG. 18 is a trihedral view schematically illustrating an example of the appearance of the imaging apparatus according to the third embodiment. FIG. 18 illustrates an imaging apparatus 300 of the third embodiment viewed from the top surface, the front surface, and the lateral surface, at (a), (b), and (c), respectively.

The imaging apparatus 300 includes an arm portion 310, a fuselage 312 provided in the central portion of the arm portion 310, and a camera 313 provided on the upper portion of the fuselage 312 and including a lens portion 314. The arm portion 310 overhangs, viewed from the top surface, on the front right side, rear right side, front left side, and rear left side, and at each distal end portion thereof, is provided with propellers 311a, 311b, 311c, and 311d driven by the respective motors.

The imaging apparatus 300 is further provided with protective members 320a, 320b, 320c, 320c', 320d, and 320d' so as to surround the arm portion 310, the fuselage 312, the lens portion 314, the camera 313, and the propellers 311a, 311b, 311c, and 311d provided on the arm portion 310. In the example in FIG. 18, the protective members 320a, 320b, 320c, 320c', 320d, and 320d' are provided in a spherical shape as a whole, so as to surround the arm portion 310, the fuselage 312, the lens portion 314, the camera 313, and the propellers 311a, 311b, 311c, and 311d provided on the arm portion 310. In the example in FIG. 18, the protective member 320a is connected to the overhanging ends of the arm portion 310 with connecting members 321a, 321b, 321c, and 321d, and the whole of the protective members 320a, 320b, 320c, 320c', 320d, and 320d' is fixed with respect to the arm portion 310 (the fuselage 312). It is desirable that the elastic material such as rubber and spring be used for the connecting members 321a to 321d.

The imaging apparatus 300 can perform vertical movement, back-and-forth movement, left-and-right movement, and hovering, and can fly in the air, by controlling the drive of the respective propellers 311a, 311b, 311c, and 311d by remote operation.

In the above description, it has been explained that, in the imaging apparatus 300 in the third embodiment, the protective members 320a, 320b, 320c, 320c', 320d, and 320d' are fixed by the connecting members 321a to 321d with respect to the arm portion 310 (the fuselage 312). However, this is not limited to this example. For example, as indicated in "Ricoh Company Ltd., "The Inspection System of Public Structures", online, searched on Oct. 25, 2016, Internet <URL: https://jp.ricoh.com/technology/institute/research/tech_inspection_system.html>", the imaging apparatus 300 may be in a configuration that retains the protective members 320a, 320b, 320c, 320c', 320d, and 320d' to be movable with respect to the arm portion 310 or the fuselage 312 using a three-axis gimbal and the like.

FIGS. 19A and 19B illustrate an example of the imaging apparatus 300' using a three-axis gimbal applicable in the third embodiment. FIG. 19A is a perspective view of the imaging apparatus 300' viewed from front and obliquely from above, and FIG. 19B illustrates a view in which a central portion of the imaging apparatus 300' is taken out. In FIGS. 19A and 19B, the portions that are common to the above-described FIG. 18 are denoted by the identical reference signs and the detailed descriptions thereof are omitted.

In the example in FIG. 19A, the imaging apparatus 300' includes an arm portion 310', the fuselage 312, a camera portion 315, and the propellers 311a to 311d provided on the respective four ends of the arm portion 310', and has a structure in which the foregoing are surrounded by a protective member 320e that forms a substantially spherical shape (a spherical shell structure). In this example, the protective member 320e is in a structure in which regular pentagons and regular hexagons are combined in what is called a soccer ball shape and the respective vertexes are joined with bar-like members.

In this example, the arm portion 310' is in a shape of what is called an H-shape in which the central portions of two parallel arms are connected by one or more of plate-like members. The arm portion 310' is provided with, at the respective distal ends of the two arms, the propellers 311a to 311d, and motors for driving the respective propellers 311a to 311d, and on the plate-like member connecting the two arms, the fuselage 312 is provided. The fuselage 312 is provided with the camera portion 315 including a lens portion at the front. In the following description, the configuration including the arm portion 310', the fuselage 312, the camera portion 315, and the propellers 311a to 311d is referred to as a main unit portion. The protective member 320e has such a size that at least the main unit portion does not make contact with the outside directly.

The main unit portion is movably retained with respect to the protective member 320e via a three-axis gimbal structure. More specifically, the three-axis gimbal structure in the example in FIG. 19A includes a member 330 that is made to be rotatable around a yaw axis (indicated by an arrow Y in FIG. 19A), a member 331a and a member 331b that are made to be rotatable around a roll axis (indicated by an arrow R in FIG. 19A), and a member 332 that is made to be rotatable around a pitch axis (indicated by an arrow P in FIG. 19A).

In the example in FIGS. 19A and 19B, the member 332 is configured as a circular rail, and along the rail, a rotary member 3320 is provided inside the member 332 so as to be freely rotatable around the pitch axis. The main unit portion is fixed to the rotary member 3320 through the members 3320a and 3320b included in the rotary member 3320. It is preferable that the main unit portion be fixed to the rotary member 3320 in such an arrangement that the optical axis of the camera portion 315 coincides with the pitch axis.

Meanwhile, the member 330 is connected to the protective member 320e by rotary members 3300a and 3300b so as to be freely rotatable around the yaw axis. The members 331a and 331b are connected to the member 330 on one end by respective rotary members 3310a and 3310b so as to be freely rotatable around the roll axis, and are fixedly connected to the member 332 on the other end.

Because the imaging apparatus 300' has such a three-axis gimbal structure, the protective member 320e is rotatable independently from the main unit portion. Thus, even when the protective member 320e collides with an obstacle, the imaging apparatus 300' can continue to fly as only the protective member 320e rotates while the main unit portion is keeping a balance, and stable imaging is possible. Furthermore, the imaging apparatus 300' can also be flied such that the protective member 320e is kept in contact with a subject with the help of the three-axis gimbal structure, to photograph a close-up image of the subject.

In the foregoing description, it has been explained that the imaging apparatus 300 is driven to fly by the four propellers 311a, 311b, 311c, and 311d provided on the respective distal end portions of the arm portion 310 protruding to the front right, rear right, front left, and rear left viewed from the top surface. However, this is not limited to this example. That is, the imaging apparatus 300 may be in other configurations, as long as the vertical movement, back-and-forth movement, left-and-right movement, and hovering are possible by remote operation. For example, as indicated in "Adrien Briod, "Insect-inspired flying robot handles collisions, goes where other robots can't", online, Oct. 30, 2013, Robohub, searched on Oct. 25, 2016, Internet <URL: http://robohub.org/insect-inspired-flying-robot-handles-collisions-goes-where-other-robots-cant/>", the imaging apparatus 300 may be in a configuration that is driven to fly by a pair of propellers provided on the top surface of the fuselage 312.

FIG. 20 illustrates one example of the configuration of the imaging apparatus 300 in the third embodiment. The imaging apparatus 300 includes a control unit 3001, a communication unit 3002, a drive unit 3003, a plurality of motors (M) 3004, 3004, and so on, a camera 3005, and a memory 3006. The control unit 3001 includes a CPU, a ROM, a RAM, and various interfaces that perform communication with the communication unit 3002, the drive unit 3003, the camera 3005, and the memory 3006 connected to the control unit 3001.

The control unit 3001 includes the CPU, the ROM, and the RAM, and in accordance with the instructions of the CPU that operates in accordance with a computer program stored in the ROM in advance and uses the RAM as a work memory, and controls the overall operation of the imaging apparatus 300. The control unit 3001 further includes a sensor (for example, a nine-axis sensor) to detect the attitude, a flight speed, a flight direction, and others of the imaging apparatus 300. Moreover, the control unit 3001 may include a receiver that supports a global navigation satellite system (GNSS) in order to acquire the current location.

The communication unit 3002 performs wireless communication with a remote controller for performing remote operation of the imaging apparatus 300. For example, the communication unit 3002 receives a control signal transmitted from the remote controller according to the user operation that controls the flight of the imaging apparatus 300, and delivers the received signal to the control unit 3001. The drive unit 3003 drives, in accordance with the control of the control unit 3001 based on the control signal, the motors 3004, 3004, and so on that rotate the respective propellers 311a, 311b, 311c, and 311d, for example.

The camera 3005 corresponds to the above-described camera 313, and in accordance with the instructions of the control unit 3001, performs imaging of the subject and outputs captured images that are still images. For example, the communication unit 3002 receives a control signal transmitted from the remote controller according to the user operation that controls the imaging by the camera 3005, and delivers the received signal to the control unit 3001. The control unit 3001, in response to this control signal, gives instructions of imaging to the camera 3005, for example.

The camera 3005 can acquire, in having performed imaging, metadata concerning the imaging together with captured images. The camera 3005 can output the captured images and the metadata acquired by the imaging. The metadata includes at least the date and time the imaging is performed (imaged time), the resolution of captured image, and the imaging distance (focal length). The captured images and the metadata that are output from the camera 3005 are supplied to the control unit 3001.

The control unit 3001 stores the captured images and the metadata supplied from the camera 3005 into a file in an Exif format, for example. This is not a limitation and the control unit 3001 may store the captured images and the metadata into a file in a proprietary format. The control unit 3001 stores into the memory 3006 the file for which the captured images and the metadata are stored. The memory 3006 is a rewritable non-volatile memory such as a flash memory, for example. The memory 3006 may be built into the imaging apparatus 300, or may be configured to be detachable with respect to the imaging apparatus 300.

The image acquisition unit 1100 illustrated in FIGS. 6 and 12 acquires captured images from a file that is stored in the memory 3006 and in which the captured images and the metadata are stored.

The camera 3005 can acquire images of a subject at a certain frame rate (for example, 60 frames/sec), and output a moving image. The control unit 3001 can transmit the moving image output from the camera by the communication unit 3002. The moving image transmitted from the communication unit 3002 can be received and displayed by the remote controller and other information processing apparatuses. The user can check the imaging target of the imaging apparatus 300, by referring to the moving image.

The imaging apparatus 300 in the third embodiment is surrounded entirely by the protective members 320a, 320b, 320c, 320c', 320d, and 320d', and thus the contact with surrounding object in some degree is allowed. Consequently, penetration into a narrow portion is also possible, and it is possible to get close to an observation object safely to acquire clear captured images.

In the captured image imaged by the imaging apparatus 300, a part of the imaging apparatus 300 or a part of the protective members 320a, 320c, 320d, or the like may be captured, and may mask a part of the observation object. According to the above-described first embodiment and second embodiment, a group of captured images in which the same place is imaged from a plurality of somewhat different positions can be browsed. Consequently, the occurrence of a place where inspection is not possible by the masking can be suppressed. Furthermore, in the captured images imaged from the imaging apparatus 300 flying in the air, the image quality may be unstable. Even in such cases, using the UI screen 200c illustrated in FIG. 15, the user can check the image quality of the respective captured images.

The above-described respective embodiments are examples illustrating the preferred embodiments of the present invention. The invention, however, is not limited to the embodiments, and various modifications can be embodied without departing from the scope and spirit of the invention.

REFERENCE SIGNS LIST 110, 120, 131, 132, 135 Image
111, 121, 133, 136 Coordinate Value
130, 130', 130a, 130b Two-dimensional development view
140, 140', 140a Panoramic image
150, 150' Three-dimensional mesh
200a, 200a', 200b, 200b', 200c, 200d UI screen
210 Panoramic-image display area
220 Inspection-image display area
230 Panorama selection area
240 Operation specifying area
300 Imaging apparatus
313, 3005 Camera
320a, 320b, 320c, 320c', 320d, 320d' Protective member
1000 Image processing apparatus
1010 CPU
1014 Display
1015 Storage
1017 Pointing device
1100 Image acquisition unit
1101 Image storage unit
1102 3D point group acquisition unit
1103 3D mesh generator
1104 2D development view generator
1105 Transformation coefficient generator
1106 Deformation unit
1107 Annotation superimposing unit
1108 Specifying unit
2100a Inspection image

CITATION LIST

Patent Literature

PTL 1: Japanese National Publication of International Patent Application No. 2011-510378

The invention claimed is:

1. An image processing method, comprising:
   generating a three-dimensional model including at least a part of a target object, from a plurality of two-dimensional images;
   approximating at least a part of the three-dimensional model by a three-dimensional mesh;
   determining a first transformation coefficient to transform respective sub-planes of the three-dimensional mesh into a two-dimensional development view;
   determining a first image from a plurality of two-dimensional images corresponding to a portion of the two-dimensional development view;
   specifying contents to be projected onto the two-dimensional development view, and a first position on the first image, according to the first image;
   generating a second image by deforming the first image based on a second transformation coefficient of the two-dimensional development view and the first image;
   superimposing the contents, as a first annotation, on the second image;
   determining a third image from the plurality of two-dimensional images;
   determining a second position on the third image, the second position corresponding to projection of the first position onto the third image;
   projecting the contents at the second position on the third image to superimpose the contents as a second annotation on the third image;
   specifying two or more corresponding points for associating coordinates of a drawing with coordinates of the second image according to a user input;
   obtaining a coordinate transformation coefficient, between the coordinates of the drawing and the coordinates of the second image based on the two or more corresponding points; and
   transforming the coordinates of the second image into the coordinates of the drawing using the coordinate transformation coefficient.

2. The image processing method according to claim 1, wherein the determining the third image is performed based on an imaging order of a plurality of captured images, each captured image of the plurality of captured images being a corresponding two-dimensional image of the plurality of two-dimensional images.

3. The image processing method according to claim 1, wherein the determining the third image is performed based on spatial locations of a plurality of captured images, each captured image of the plurality of captured images being a corresponding two-dimensional image of the plurality of two-dimensional images.

4. The image processing method according to claim 1, wherein the determining the third image is performed based on a user specified position and at least one of
   a set of projection positions with respect to projection of a user specified position, which is specified with respect to the two-dimensional development view according to the user operation, onto coordinates of the plurality of two-dimensional images, and
   a set of resolutions of peripheries of the projection positions on the plurality of two-dimensional images.

5. The image processing method according to claim 1, further comprising generating the three-dimensional mesh of a developable surface.

6. The image processing method according to claim 1, further comprising generating the three-dimensional mesh of a spherical surface.

7. The image processing method according to claim 1, wherein in the determining the first transformation coefficient, respective sub-planes constituting the three-dimensional mesh are transformed into two-dimensional coordinates such that shapes and relative areas of the sub-planes viewed from a normal direction are retained.

8. The image processing method according to claim 1, wherein in the determining the first transformation coefficient, the first transformation coefficient is calculated using a homography matrix.

9. The image processing method according to claim 1, wherein the determining the first transformation coefficient includes moving the three-dimensional mesh to a certain direction according to a user operation.

10. The image processing method according to claim 9, wherein in the determining the first transformation coefficient, the certain direction is determined based on a weighted sum of normal vectors of respective sub-planes of the three-dimensional mesh.

11. A display device, comprising:
    processing circuitry configured to
       generate a three-dimensional model including at least a part of a target object, from a plurality of two-dimensional images;
       approximate at least a part of the three-dimensional model by a three-dimensional mesh;
       determine a first transformation coefficient to transform respective sub-planes of the three-dimensional mesh into a two-dimensional development view;
       determine a first image from a plurality of two-dimensional images corresponding to a portion of the two-dimensional development view;
       specify contents to be projected onto the two-dimensional development view, and a first position on the first image, according to the first image;
       generate a second image by deforming the first image based on a second transformation coefficient of the two-dimensional development view and the first image;
       superimpose the contents, as a first annotation, on the second image;
       determine a third image from the plurality of two-dimensional images;
       determine a second position on the third image, the second position corresponding to projection of the first position onto the third image;
       project the contents at the second position on the third image to superimpose the contents as a second annotation on the third image;
       specify two or more corresponding points for associating coordinates of a drawing with coordinates of the second image according to a user input;
       obtain a coordinate transformation coefficient, between the coordinates of the drawing and the coordinates of the second image based on the two or more corresponding points; and
       transform the coordinates of the second image into the coordinates of the drawing using the coordinate transformation coefficient.

12. The display device according to claim 11, wherein the processing circuitry is further configured to:
    generate display control information for controlling a display to display a user interface screen and an image, and
    detect the user input, wherein
    the user interface screen includes:

a first display area where the first image is displayed and the user input is detected; and
a second display area where the second image is displayed and the user input is detected.

13. The display device according to claim 12, wherein the user interface screen further includes a third display area where the user input is detected and at least one image out of one or more second images is selected.

14. The display device according to claim 13, wherein the user interface screen displays plural second images, in combination as a three-dimensional shape, in the third display area.

15. The display device according to claim 12, wherein the processing circuitry is configured to control the display to display the drawing.

16. The display device according to claim 12, wherein the processing circuitry is configured to:
select the drawing according to the user input; and
specify the two or more corresponding points that each correspond to one of two or more control points of the selected drawing, on coordinates of the second image according to the user input.

17. The display device according to claim 15, wherein the processing circuitry is configured to input a value indicative of a distance between two of the two or more corresponding points according to the user input.

18. The display device according to claim 12, wherein the processing circuitry is configured to control the display to display image quality for each area of the second image using at least one of color coding and contour lines, in the second display area, and
the image quality includes at least one of imaging resolution, an imaging distance, a blurred degree, and contrast.

19. The display device according to claim 12, wherein the processing circuitry is configured to:
store a browsing history of an image displayed in the first display area into a storage medium; and
control the display to display a browsed area in the second display area based on the browsing history.

20. An inspection system for performing an inspection using images, the inspection system comprising:
the display device of claim 12;
an imaging apparatus including:
a camera configured to output a two-dimensional image;
a fuselage that includes a flight mechanism and on which the camera is installed; and
a protective member surrounding the camera and the fuselage such that the camera and the fuselage make no direct contact with an external object; and
an image processing apparatus, wherein
the camera is further configured to capture at least a part of the imaging apparatus.

* * * * *